(12) United States Patent
Zhu et al.

(10) Patent No.: US 12,456,169 B2
(45) Date of Patent: Oct. 28, 2025

(54) IMAGE PROCESSING METHOD AND APPARATUS

(71) Applicant: Tencent Cloud Computing (Beijing) Co., Ltd., Beijing (CN)

(72) Inventors: Feida Zhu, Beijing (CN); Ying Tai, Beijing (CN); Chengjie Wang, Beijing (CN); Jilin Li, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 410 days.

(21) Appl. No.: 18/129,213

(22) Filed: Mar. 31, 2023

(65) Prior Publication Data
US 2023/0237630 A1 Jul. 27, 2023

Related U.S. Application Data

(63) Continuation of application No. PCT/CN2021/108489, filed on Jul. 26, 2021.

(30) Foreign Application Priority Data

Jun. 3, 2021 (CN) .......................... 2021106203828

(51) Int. Cl.
*G06T 5/50* (2006.01)
*G06T 5/77* (2024.01)
(Continued)

(52) U.S. Cl.
CPC .................. *G06T 5/50* (2013.01); *G06T 5/77* (2024.01); *G06T 7/11* (2017.01); *G06T 9/00* (2013.01);
(Continued)

(58) Field of Classification Search
CPC ..... G06T 5/50; G06T 5/77; G06T 7/11; G06T 9/00; G06T 2207/20081;
(Continued)

(56) References Cited

U.S. PATENT DOCUMENTS

2020/0349391 A1* 11/2020 Zhang ................. G06F 18/2148
2020/0372351 A1 11/2020 Chang et al.

FOREIGN PATENT DOCUMENTS

| CN | 110084193 A | 8/2019 |
| CN | 111402118 | 7/2020 |

(Continued)

OTHER PUBLICATIONS

Office action issued in Korean application No. 10-2023-7030383, dated Oct. 16, 2024, 6 pages (with English translation).
(Continued)

*Primary Examiner* — Said Broome
*Assistant Examiner* — Andrew Shin
(74) *Attorney, Agent, or Firm* — Crowell & Moring LLP

(57) ABSTRACT

This disclosure relates to image processing method and apparatus. The method includes: processing, with a first generator in an image processing model, a first sample image in a first sample set to obtain a first predicted image; processing, with the first generator, a second sample image in a second sample set to obtain a second predicted image; and training the image processing model according to a difference between the target avatar in the first sample image and the first predicted avatar and a difference between a first type attribute of the sample avatar in the second sample image and a first type attribute of the second predicted avatar.

20 Claims, 12 Drawing Sheets

(51) Int. Cl.
  *G06T 7/11* (2017.01)
  *G06T 9/00* (2006.01)
  *G06V 10/25* (2022.01)
  *G06V 10/74* (2022.01)
(52) U.S. Cl.
  CPC ............ *G06V 10/25* (2022.01); *G06V 10/761* (2022.01); *G06T 2207/20081* (2013.01); *G06T 2207/20221* (2013.01)
(58) Field of Classification Search
  CPC ........... G06T 2207/20221; G06T 11/60; G06T 2207/10016; G06T 2207/20084; G06T 7/194; G06T 3/04; G06T 3/40; G06V 10/25; G06V 10/761; G06V 10/774; G06V 10/776; G06V 10/82; G06F 18/214
  See application file for complete search history.

(56) References Cited

FOREIGN PATENT DOCUMENTS

| CN | 111523413   | 8/2020  |
|----|-------------|---------|
| CN | 111523413 A | 8/2020  |
| CN | 111783603   | 10/2020 |
| CN | 111860362   | 10/2020 |
| CN | 112017140 A | 12/2020 |
| JP | 2021-43839 A| 3/2021  |

OTHER PUBLICATIONS

Office action issued in Japanese applicatin No. 2023-576240, dated Dec. 3, 2024, 10 pages (with English translation).
Yang et al., "Face Swapping Neural Networks Based on Improved Autoencoders," IEEE 5th International Conference on Big Data Intelligence and Computing, (DATACOM), Nov. 2019, 107-112.
Yan et al., "Video Face Swap Based on Autoencoder Generation Network," International Conference on Audio, Language and Image Processing (ICALIP), Jul. 2018, 103-108.
Wiles et al., "X2Face: A Network for Controlling Face Generation Using Images, Audio, and Pose Codes," In Proceedings of the European Conference on Computer Vision, Oct. 2018, pp. 690-706.
Li et al., "Advancing High Fidelity Identity Swapping for Forgery Detection," In Proceedings of the IEEE/CVF Conference on Computer Vision and Pattern Recognition, Jun. 2020, pp. 5074-5083.
Burkov et al., "Neural Head Reenactment with Latent Pose Descriptors," In IEEE/CVF Conference on Computer Vision and Pattern Recognition (CVPR) Jun. 2020, pp. 13783-13792.
Extended European Search Report in European application No. 21943728.2, dated Jul. 23, 2024, 6 pages.
Office action in Japanese application No. 2023-576240, dated Jul. 16, 2024, 10 pages (with English translation).
International Search Report issued Feb. 24, 2022 in International (PCT) Application No. PCT/CN2021/108489.

* cited by examiner

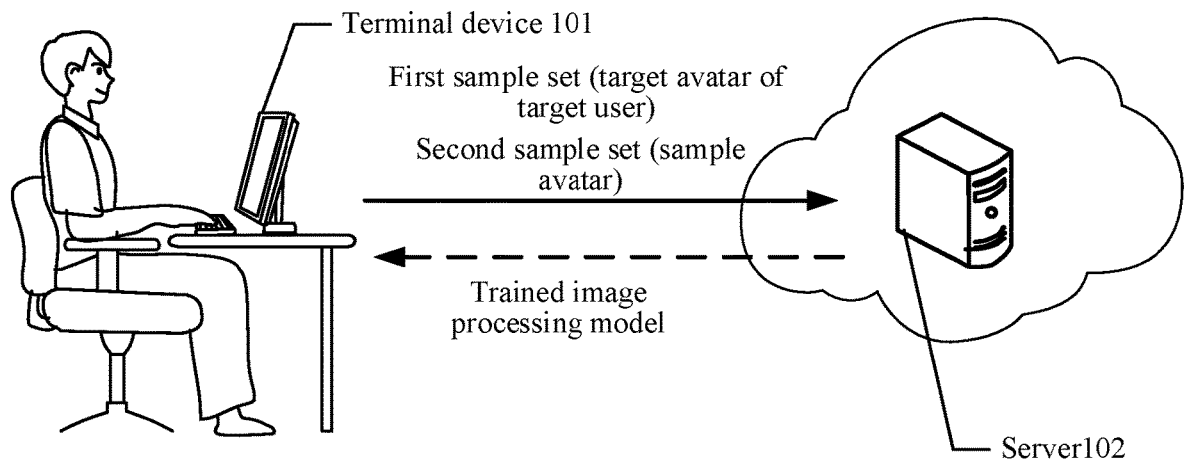

FIG. 1

```
┌─────────────────────────────────────────────────────────────────┐
│ Process, with a first generator in an image processing model, a first sample image │
│ $x_i$ in a first sample set to obtain a first predicted image, the first predicted image │
│              $x_i'$ including a first predicted avatar                │
└─────────────────────────────────────────────────────────────────┘ ~S201
                                 ↓
┌─────────────────────────────────────────────────────────────────┐
│ Process, with the first generator, a second sample image $y_k$ in a second sample set │
│   to obtain a second predicted image $y_k'$, the second predicted image including a │
│                      second predicted avatar                      │
└─────────────────────────────────────────────────────────────────┘ ~S202
                                 ↓
┌─────────────────────────────────────────────────────────────────┐
│   Train the image processing model on the basis of a difference between a target │
│       avatar in the first sample image $x_i$ and the first predicted avatar $x_i'$, and a │
│ difference between a first type attribute of the sample avatar in the second sample │
│    image $y_k$ and a first type attribute of the second predicted avatar $y_k'$       │
└─────────────────────────────────────────────────────────────────┘ ~S203
```

FIG. 2

IMAGE PROCESSING METHOD AND APPARATUS

RELATED APPLICATION

This application is a continuation application of PCT Patent Application No. PCT/CN2021/108489, filed on Jul. 26, 2021, which claims priority to Chinese Patent Application No. 2021106203828, entitled "IMAGE PROCESSING METHOD, APPARATUS AND DEVICE, AND COMPUTER-READABLE STORAGE MEDIUM" filed on Jun. 3, 2021, wherein the content of the above-referenced applications is incorporated herein by reference in its entirety.

FIELD OF THE TECHNOLOGY

This disclosure relates to the field of computer technologies, and particularly, to an image processing method, apparatus and device, and a computer-readable storage medium.

BACKGROUND OF THE DISCLOSURE

With the continuous development of computer technologies, image processing technology has been widely developed. It is a relatively novel attempt and application to realize avatar reshaping by using the image processing technology. The avatar reshaping refers to a process of replacing an original avatar in an image with a target avatar.

SUMMARY

Embodiments of this disclosure provide an image processing method, apparatus and device, and a computer-readable storage medium, which can train an image processing model, the processing accuracy of the trained image processing model is relatively high, an avatar obtained by replacement has relatively high reality, and the image processing model has a wide range of usage scenarios.

In an aspect, an embodiment of this disclosure provides an image processing method, which includes:

processing, with a first generator in an image processing model, a first sample image $x_i$ in a first sample set to obtain a first predicted image $x'_i$, the first predicted image $x'_i$ comprising a first predicted avatar, the first sample set comprising N first sample images, each of the first sample images comprising a target avatar corresponding to a same target user, N being a positive integer, i being a positive integer, and $i \leq N$;

processing, with the first generator, a second sample image $y_k$ in a second sample set to obtain a second predicted image $y'_k$, the second predicted image $y'_k$ comprising a second predicted avatar; the second sample set comprising M second sample images, each of the second sample images comprising a sample avatar, M being a positive integer, k being a positive integer, and $k \leq M$; and training the image processing model according to a difference between the target avatar in the first sample image $x_i$ and the first predicted avatar and a difference between a first type attribute of the sample avatar in the second sample image $y_k$ and a first type attribute of the second predicted avatar, the image processing model being configured to replace an avatar in an input image with the target avatar and retain the first type attribute of the avatar in the input image.

In an aspect, an embodiment of this disclosure provides an image processing apparatus. The image processing apparatus includes a memory operable to store computer-readable instructions and a processor circuitry operable to read the computer-readable instructions. When executing the computer-readable instructions, the processor circuitry is configured to:

process, with a first generator in an image processing model, a first sample image $x_i$ in a first sample set to obtain a first predicted image $x'_i$, the first predicted image $x'_i$ comprising a first predicted avatar, the first sample set comprising N first sample images, each of the first sample images comprising a target avatar corresponding to a same target user, N being a positive integer, i being a positive integer, and $i \leq N$;

process, with the first generator, a second sample image $y'_k$ in a second sample set to obtain a second predicted image $y'_k$, the second predicted image $y'_k$ comprising a second predicted avatar; the second sample set comprising M second sample images, each of the second sample images comprising a sample avatar, M being a positive integer, k being a positive integer, and $k \leq M$; and train the image processing model according to a difference between the target avatar in the first sample image $x_i$ and the first predicted avatar and a difference between a first type attribute of the sample avatar in the second sample image $y_k$ and a first type attribute of the second predicted avatar, the image processing model being configured to replace an avatar in an input image with the target avatar and retain the first type attribute of the avatar in the input image.

In an aspect, an embodiment of this disclosure provides a non-transitory machine-readable media. The computer-readable storage media stores instructions. When being executed, the instructions are configured to cause a machine to:

process, with a first generator in an image processing model, a first sample image $x_i$ in a first sample set to obtain a first predicted image $x'_i$, the first predicted image $x'_i$ comprising a first predicted avatar, the first sample set comprising N first sample images, each of the first sample images comprising a target avatar corresponding to a same target user, N being a positive integer, i being a positive integer, and $i \leq N$;

process, with the first generator, a second sample image $y_k$ in a second sample set to obtain a second predicted image $y'_k$, the second predicted image $y'_k$ comprising a second predicted avatar; the second sample set comprising M second sample images, each of the second sample images comprising a sample avatar, M being a positive integer, k being a positive integer, and $k \leq M$; and train the image processing model according to a difference between the target avatar in the first sample image $x_i$ and the first predicted avatar and a difference between a first type attribute of the sample avatar in the second sample image $y_k$ and a first type attribute of the second predicted avatar, the image processing model being configured to replace an avatar in an input image with the target avatar and retain the first type attribute of the avatar in the input image.

The technical solutions according to the embodiments of this disclosure may include the following beneficial effects:

The image processing model is trained based on an avatar difference between the first sample image and the first predicted image obtained by processing the first sample image through the first generator and a first type attribute difference between the second sample image and the second predicted image obtained by processing the second sample image through the first generator, so that the trained image processing model can learn the ability to replace the avatar in the input image with the target avatar and retain the first type attribute of the avatar in the input image. Therefore, the replaced avatar has relatively high reality, and the accuracy and the replacement effect of image processing are improved.

It is to be understood that both the foregoing general description and the following detailed description are exemplary and explanatory only and do not constitute any limitation on this disclosure.

BRIEF DESCRIPTION OF THE DRAWINGS

In order to describe the technical solutions in the embodiments of this disclosure more clearly, the drawings required to be used in descriptions about the embodiments will be simply introduced below. Apparently, the drawings in the following descriptions are only some embodiments of this disclosure. Those of ordinary skill in the art may further obtain other drawings according to these drawings without creative work.

FIG. 1 is an image processing scenario diagram according to an exemplary embodiment of this disclosure.

FIG. 2 is a flowchart of an image processing method according to an exemplary embodiment of this disclosure.

DESCRIPTION OF EMBODIMENTS

Figure 3:
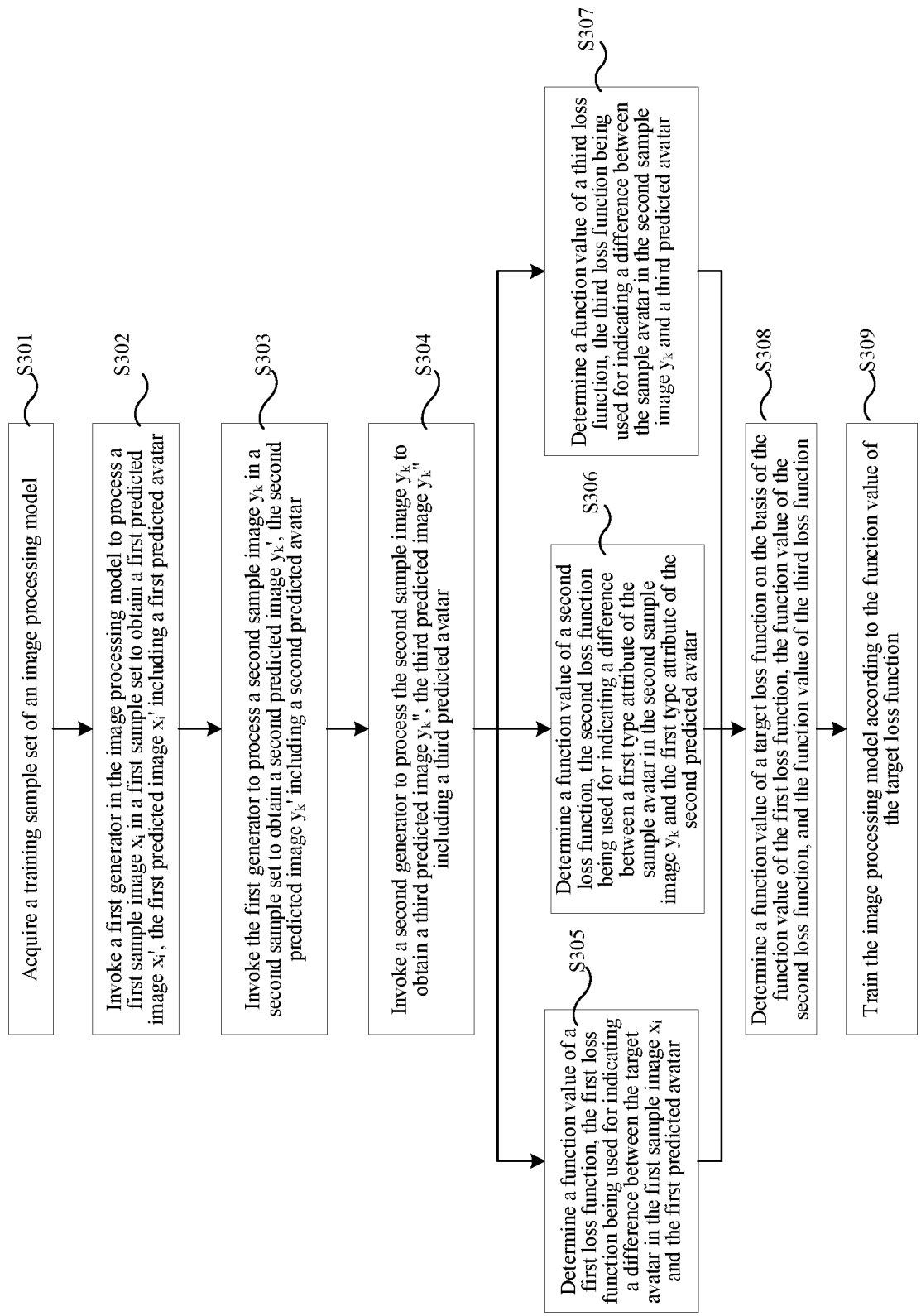
FIG. 3 is a flowchart of another image processing method according to an exemplary embodiment of this disclosure.

Exemplary embodiments are described in detail herein, and examples of the exemplary embodiments are presented in the drawings. When the following description relates to the drawings, unless specified otherwise, same numbers in different drawings represent same or similar elements. Implementations described in the following exemplary embodiments do not represent all implementations consistent with this disclosure. On the contrary, they are merely examples of a method that is consistent with some aspects of this disclosure described in detail in claims.

The following clearly and completely describes the technical solutions in embodiments of this disclosure with reference to the drawings in the embodiments of this disclosure.

The embodiments of this disclosure relate to techniques such as artificial intelligence (AI) and machine learning (ML).

In addition, the embodiments of this disclosure also relate to avatar reshaping and a generator. The avatar reshaping refers to a process of replacing all or some of avatar features in a first portrait into a second portrait. In the embodiment of this disclosure, the second portrait is input into an image processing model to obtain a predicted portrait output by the image processing model. The predicted portrait has both the avatar of the first portrait and the first type attribute of the second portrait. In some implementations, the predicted portrait having the avatar of the first portrait means that the predicted portrait has both the avatar of the first portrait, for example, appearance features such as facial features, hair, skin, and glasses, and a first type attribute of the second portrait, for example, attribute features such as a posture, an expression, and illumination.

The generator is a component of a generative adversarial network (GAN). The GAN is a method of unsupervised learning, which consists of a generator and a discriminator. An input of the discriminator is a real sample image (namely, a real image, the real image referring to a non-model generated image) or a predicted image (namely, a false image, the false image referring to an image generated based on a model) output by the generator. A purpose of the discriminator is to discriminate the reality of the predicted image output by the generator and the real sample image as much as possible, that is, capable of discriminating which real images are and which predicted images are. However, the generator is to enable the generated predicted image not to be recognized by the discriminator as much as possible, that is, to enable the predicted image to be as realistic as possible. The two generators confront each other, parameters are continuously adjusted (that is, are optimized mutually), and eventually, the predicted image generated by the generator is difficult to be discriminated as false by the discriminator, or the recognition accuracy of the discriminator reaches a threshold.

Based on a computer vision technology and a machine learning technology in the AI technology, the embodiments of this disclosure provide an image processing method. The image processing model is trained based on the GAN, so that the trained image processing model can reshape any avatar into a target avatar, and a replaced avatar retains a first type attribute of any avatar (namely, realizing avatar reshaping).

FIG. 1 is an image processing scenario diagram according to an exemplary embodiment of this disclosure. As shown in FIG. 1, an image processing scenario includes a terminal device 101 and a server 102. The terminal device 101 is a device used by a user, and further the terminal device may also be a device having an image acquisition function or an interface display function. The terminal device 101 may include but is not limited to: devices, such as smartphones (for example, Android mobile phones, and iOS mobile phones), tablet computers, portable personal computers, and mobile Internet devices (MID). The terminal device is configured with a display apparatus. The display apparatus may also be a display, a display screen, a touch screen, and the like. The touch screen may also be a touch control screen, a touch panel, and the like. No limits are made thereto in the embodiments of this disclosure.

The server 102 refers to a background device capable of training an image processing model according to an acquired sample. After obtaining the trained image processing model, the server 102 may return the trained image processing model to the terminal device 101, or may deploy the trained image processing model in the server. The server 102 may be an independent physical server, may also be a server cluster or a distributed system composed of a plurality of physical servers, or may also be a cloud server providing basic cloud computing services, such as a cloud service, a cloud database, cloud computing, a cloud function, cloud storage, a network service, cloud communication, a middleware service, a domain name service, a security service, a content delivery network (CDN), large data, and an artificial intelligence platform. In addition, a plurality of servers may also be grouped into a block chain network, each server is a node in the block chain network, and the servers perform training, storage, or distribution of the image processing model together. The terminal device 101 and the server 102 may be directly or indirectly connected through wired communication or wireless communication. No limits are made thereto in the embodiments of this disclosure.

It is to be noted that quantities of terminal devices and servers in a model processing scenario shown in FIG. 1 are merely examples. For example, the quantities of terminal devices and servers may be multiple. This disclosure does not limit the quantities of the terminal devices and the servers.

In the image processing scenario shown in FIG. 1, an image processing flow mainly includes the following steps:

(1) A server acquires a training sample set of an image processing model. The training sample set may be acquired from a terminal device or may be acquired from a database. The training sample set includes a first sample set and a second sample set. The first sample set includes N first sample images, and each first sample image includes a target avatar of the same target user. The second sample set includes M second sample images, each second sample image includes a sample avatar, and both M and N are positive integers. The image processing model includes a first generator.

The sample avatar included in the second sample image refers to an avatar of a user other than the target user, for example, the first sample set includes N first sample images, and each first sample image includes an avatar of a user A. The second sample set includes M second sample images, and each second sample image includes a sample avatar of a user other than the user A. In some implementations, sample avatars in the M second sample images correspond to different users. The first generator in the trained image processing model may generate a predicted image corresponding to the user A. The predicted image has an avatar of the user A, and also retains a first type attribute of the avatar in the original input image.

(2) The server selects a first sample image $x_i$ from the first sample set, and invokes the first generator to process the first sample image $x_i$ (the image is a real image) to obtain a first predicted image $x'_i$ (the image is a false image), i is a positive integer, and i≤N. The operation of invoking the first generator to process the first sample image $x_i$ refers to: a first feature vector of an avatar in the first sample image $x_i$ is extracted by an encoder in the first generator, and the first feature vector is decoded by a decoder in the first generator to obtain a first predicted image $x'_i$.

(3) The server selects a second sample image $y_k$ from the second sample set, and invokes the first generator to perform generation processing on the second sample image $y_k$ (the image is a real image) to obtain a second predicted image $y'_k$ (the image is a false image), k is a positive integer, and k≤M. The operation of invoking the first generator to perform generation processing on a second sample image $y_k$ refers to: a second feature vector of an avatar in the second sample image $y_k$ is extracted by the encoder in the first generator, and the second feature vector is decoded by the decoder in the first generator to obtain a second predicted image $y'_k$.

(4) The server trains the image processing model according to a difference between a target avatar in the first sample image $x_i$ and an avatar in the first predicted image $x'_i$ (namely, the first predicted avatar), and a difference between a first type attribute of the sample avatar in the second sample image $y_k$ and the first type attribute of the avatar in the second predicted image $y'_k$ (the second predicted avatar).

In one embodiment, the server may calculate a difference between images by a constructed loss function. For example, the server determines the difference between the target avatar in the first sample image $x_i$ and the first predicted avatar by a first loss function, determines the difference between the first type attribute of the sample avatar in the second sample image $y_k$ and the first type attribute in the second predicted image $y'_k$ by a second loss function, determines a function value of a target loss function based on a function value of the first loss function and a function value of the second loss function, and updates parameters of the image processing model based on the function value of the target loss function to train the image processing model.

(5) The above step (2) to step (4) are iteratively performed until the image processing model reaches a training completion condition. The training completion condition is that a loss value of the target loss function does not decrease with a number of iterations any longer, or the number of iterations reaches a number threshold, or the loss value of the target loss function is less than a loss threshold, and the like. The trained image processing model may replace an avatar in an input image with the target avatar, and retain the first type attribute of an image in an input avatar.

Based on the above description, the image processing method according to an embodiment of this disclosure will be described in detail with reference to the drawings.

Taking one iterative process of the image processing model as an example, FIG. 2 is a flowchart of an image processing method according to an exemplary embodiment of this disclosure. The image processing method may be performed by the server 102 shown in FIG. 1, and as shown in FIG. 2, the image processing method includes but is not limited to the following steps:

S201. Invoke a first generator in an image processing model to process a first sample image $x_i$ in a first sample set to obtain a first predicted image $x'_i$. The first predicted image $x'_i$ includes a first predicted avatar, the first sample set includes N first sample images, each first sample image includes a target avatar corresponding to the same target user, N is a positive integer, i is a positive integer, and i≤N.

Illustratively, N images in the first sample set all include the avatar of the user A. The N first sample images may be images of the user A in different scenarios, for example, the user A in different images in the first sample set may have different postures such as head up, or head down, and different expressions such as smiling or crying.

S202. Invoke the first generator to process a second sample image $y_k$ in a second sample set to obtain a second predicted image $y'_k$. The second predicted image $y'_k$ includes a second predicted avatar, the second sample set includes M second sample images, each second sample image includes a sample avatar, M is a positive integer, k is a positive integer, and k≤M.

The M images in the second sample set include an avatar of a user other than the user A. Illustratively, the avatar in the second sample set may be an image including avatars of any one or more users other than the user A. In order to avoid over-fitting of a training process, the second sample set may include images corresponding to avatars of a plurality of different users. In some implementations, the avatar in the second sample set may include images of any one or more users other than the user A in different scenarios.

S203. Train the image processing model based on a difference between the target avatar in the first sample image $x_i$ and the first predicted avatar, and a difference between a first type attribute of the sample avatar in the second sample image $y_k$ and a first type attribute of the second predicted avatar.

The server judges whether an updated image processing model reaches a training completion condition, then iterates, if the updated image processing model does not reach the training completion condition, the above processes of S201 to S203 until the image processing model reaches the training completion condition, or ends, if the updated image processing model reaches the training completion condition, the training of the image processing model. The image processing model is configured to replace an avatar in an input image with the target avatar and retain the first type attribute of the avatar in the input image.

The step that the avatar in the input image is replaced with the target avatar may refer to replacing a second type attribute in the input image with a second type attribute in the target avatar. The second type attribute is another attribute other than the first type attribute, that is, the replaced image retains both the second type attribute of the target avatar and the first type attribute of the avatar in the input image.

A requirement of 1vN avatar reshaping can be met by the trained image processing model. The first generator can replace the target avatar of a target user into an avatar of any other user in a different scenario, namely, the first generator can acquire an image having the first type attribute of the input image and the second type attribute of the target avatar of the target user by processing the input image (an image including the avatar of any other user).

In the embodiment of this disclosure, a target user corresponding to N images in the first sample set is a user providing a second type attribute of an avatar. After the training of an image processing model is completed, after the input image is processed by the first generator in the trained image processing model, the avatar in the obtained predicted image has both the second type attribute of the avatar of the target user and the first type attribute of the input image. Illustratively, the user corresponding to the N images in the first sample set is the user A, and when any image is processed through the first generator in the image processing model, an avatar image including the second type attribute of the avatar of the user A can be obtained.

In the solution shown in the embodiment of this disclosure, the avatar of any user may be replaced with the avatar of the target user, so as to realize avatar replacement application of 1vN, which extends the application scenario of avatar reshaping.

In some implementations, the first type attribute is a non-identity recognition attribute, and the second type attribute refers to an identity recognition attribute. Illustratively, the identity recognition attribute may include appearance features such as facial features, hair, skin, and glasses. The non-identity recognition attribute may include feature attributes such as an expression, a posture, and illumination. FIG. 3 is a flowchart of another image processing method according to an exemplary embodiment of this disclosure. The image processing method may be performed by the server 102 shown in FIG. 1, and as shown in FIG. 3, the image processing method includes but is not limited to the following steps:

S301. Acquire a training sample set of an image processing model.

Figure 4:
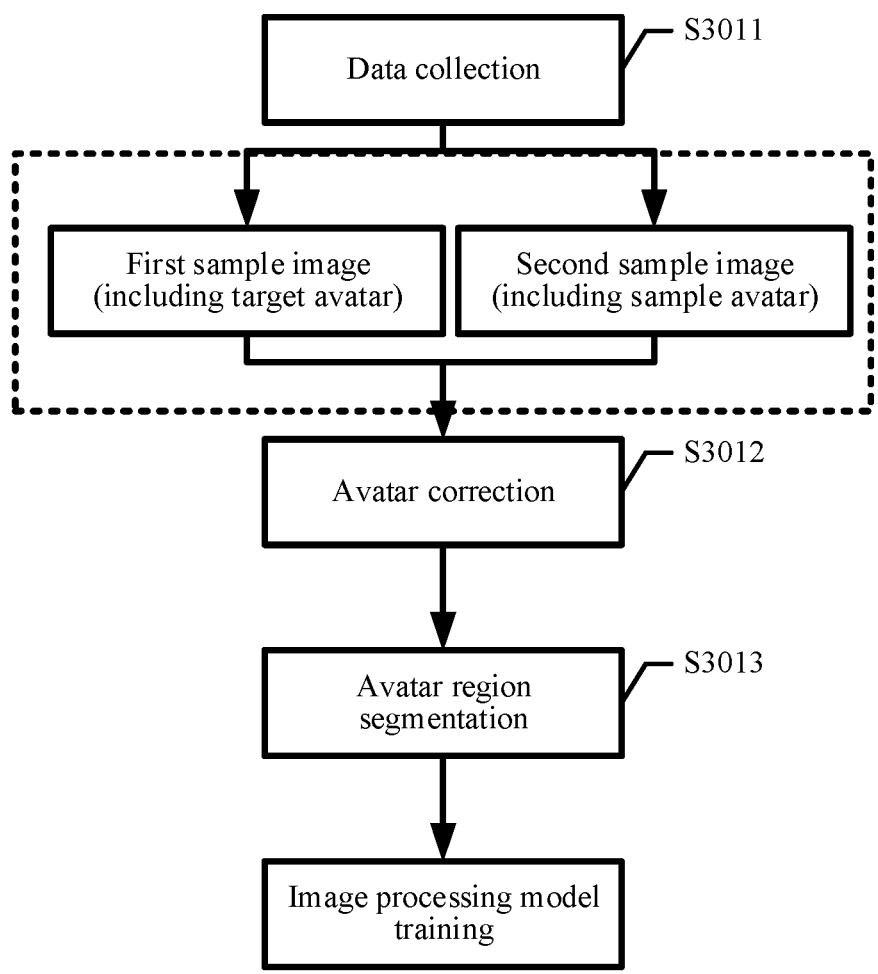
FIG. 4 is a flowchart illustrating generation of a training sample set according to an exemplary embodiment of this disclosure.

In an implementation, to improve the stability and accuracy of model training, the images in the training sample set are images subjected to pre-processing. The pre-processing includes at least one of processes such as avatar correction and avatar region segmentation. Illustratively, FIG. 4 is a flowchart illustrating generation of a training sample set according to an exemplary embodiment of this disclosure. As shown in FIG. 4, a flow of acquiring the training sample set of the image processing model mainly includes steps S3011-S3013.

S3011: Data collection stage.

The server acquires a first original sample set and a second original sample set. Each image in the first original sample set includes a target avatar of a target user, and each image in the second original sample set includes a sample avatar of a user other than the target user. In some implementations, the server may acquire an image including a corresponding avatar by performing image frame extraction on a video. Taking a process of acquiring the first original sample set as an example, the server may acquire the image including the target avatar from the video corresponding to the target user. The video corresponding to the target user may be a video uploaded by a terminal device, the video has a certain duration length, and the server may extract X images including the target avatar of the target user from the video by means of image frame extraction to obtain the first original sample set. In the same way, the second original sample set may also be obtained. Or, in some implementations, images respectively corresponding to each user are pre-stored in a database, and accordingly, the step that the server acquires the first original sample set and the second original sample set from the database includes that: The server may acquire X images including the target avatar of the target user based on identity information corresponding to the target user to form the first original sample set, and acquire at least two images including a sample avatar of another user based on identity information other than the identity information of the target user to form the second original sample set. The users corresponding to different images in the second original sample set may be the same or different.

In some implementations, the above two methods for acquiring an original sample set may be used in combination. Illustratively, the server may acquire the first original sample set by performing image frame extraction on the video, and acquire the second original sample set from the database. Or, the server may acquire the second original sample set by performing image frame extraction on the video, and acquire the first original sample set from the database. Or, the server acquires part of images in the first original sample set/the second original sample set by performing image frame extraction on the video, and acquires the other part of the image in the first original sample set/the second original sample set from the database.

S3012. Avatar correction stage. The server may perform avatar region detection on the images in the acquired original sample sets (including the first original sample set and the second original sample set) through a face detection algorithm (such as an AdaBoost framework, a deformable part model (DMP), and cascade convolutional neural network (CNN)), and perform calibration on an avatar region (for example, adopting a regression tree-based face alignment algorithm), which has a purpose of locating an accurate shape of the avatar on a known avatar region. In addition, the server may also correct the avatar through an avatar posture correction algorithm, such as a 3D morphable models (3DMM) algorithm to obtain a corrected avatar, namely, to obtain a front avatar corresponding to the original avatar. The image processing model is trained by the corrected avatar, which helps to improve the stability of model training. In some implementations, the original sample image set after avatar correction may be acquired as a training sample set, or the server may further perform avatar region segmentation on the original sample image set after the avatar correction, and acquire the sample image set after the avatar region segmentation as a training sample set. After obtaining the corrected training sample set, the server may directly start a training process for the image processing model, that is, perform step S302, or may continue to perform step S3013.

S3013. Avatar region segmentation stage. Since the server has determined the avatar region of each image in the original sample image set in step S3012, the server can crop each image in the corrected original sample image set, and only retains the avatar region in each image. That is to say, before the image processing model is trained, the avatar correction and the avatar segmentation are performed on the original sample image set in advance, and compared with directly training the image processing model by using the original sample image set, the training efficiency of the image processing model can be improved by training the image processing model by using the sample image which only retains the avatar region.

S302. Invoke a first generator in an image processing model to process a first sample image $x_i$ in a first sample set to obtain a first predicted image $x'_i$.

The first sample image $x_i$ is any first sample image in the first sample set.

In an implementation, the first generator includes an encoder and a first decoder. The encoder is configured to extract an image feature to obtain a feature vector corresponding to a sample image. The first decoder is configured to generate a predicted image according to the feature vector.

Illustratively, a process of obtaining the first predicted image includes: after acquiring the first sample image $x_i$, encoding, by the encoder in the first generator, the first sample image $x_i$ to obtain a first feature vector corresponding to the first sample image $x_i$; and after obtaining the first feature vector, invoking, by the server, the first decoder to decode the first feature vector to obtain a first generated image and first region segmentation information. The first region segmentation information is used for indicating an avatar region in the first generated image. Further, the server extracts a first predicted image $x'_i$ from the first generated image according to the first region segmentation information.

Figure 5:
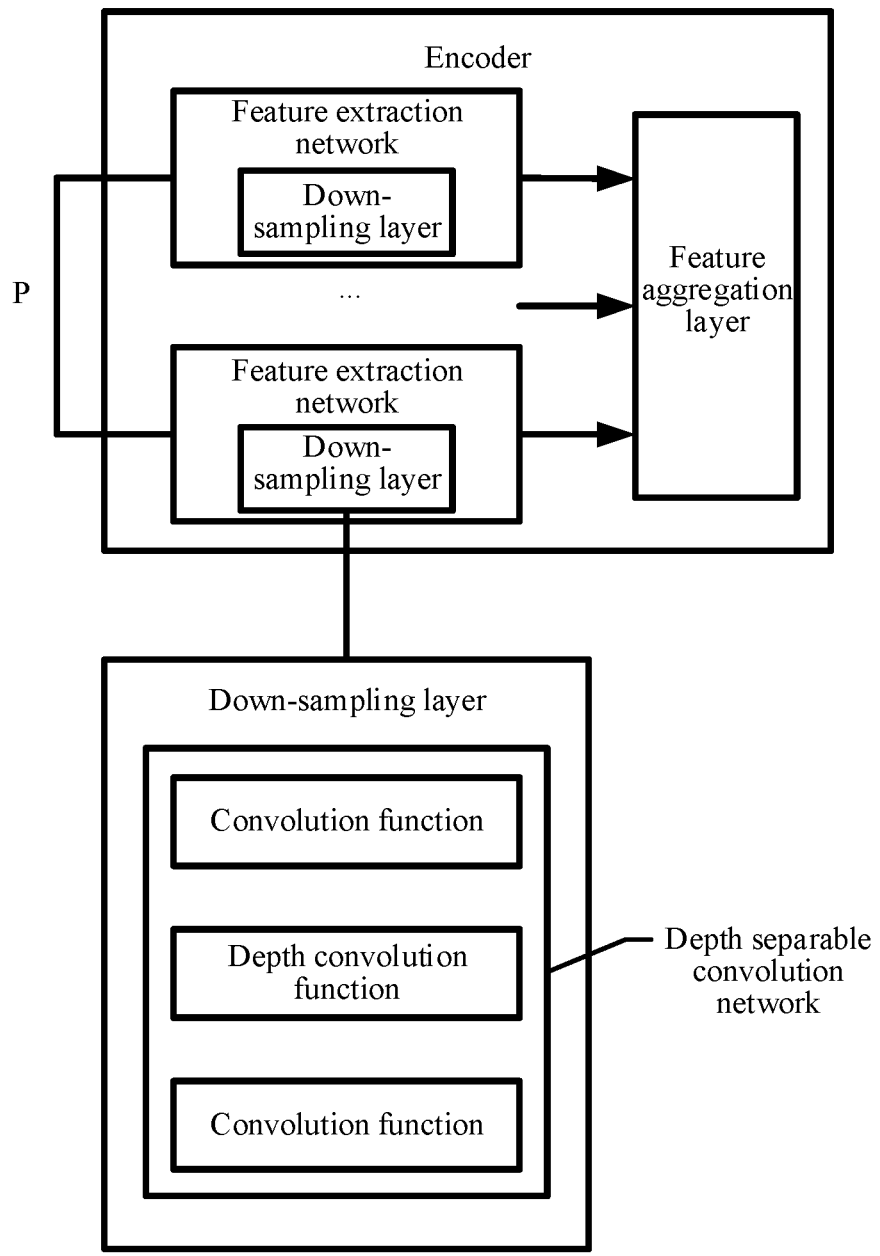
FIG. 5 is a schematic structural diagram of an encoder according to an exemplary embodiment of this disclosure.

Illustratively, FIG. 5 is a schematic structural diagram of an encoder according to an exemplary embodiment of this disclosure. As shown in FIG. 5, the encoder includes P feature extraction networks and a feature aggregation layer, and P is a positive integer. Each feature extraction network includes a down-sampling layer. Therefore, there are P down-sampling layers corresponding to one encoder. Scale parameters of the P down-sampling layers are different. For example, in a first down-sampling layer, dilation (scale parameter)=1. In a second down-sampling layer, dilation (scale parameter)=2. In a third down-sampling layer, dilation (scale parameter)=4. Further, each down-sampling layer is constructed based on a depth separable convolution (DSN) network. The DSN includes a convolution function (Conv2d, k=1) and a depth convolution function (DepthConv2d, k=3, s=2, dilation=d). On this basis, an implementation of invoking, by the server, the encoder to encode the first sample image $x_i$ to obtain the first feature vector includes:

extracting feature information of the first sample image $x_i$ under P different scale parameters through the down-sampling layers (namely, the P down-sampling layers) in the P feature extraction networks; and performing aggregating processing on the feature information of the first sample image $x_i$ under the P scale parameters through the feature aggregation layer to obtain the first feature vector corresponding to the first sample image $x_i$.

In an implementation, the first decoder includes one first feature reshaping network, Q first image reconstruction networks, and one first convolution network, and Q is a positive integer. Each first image reconstruction network includes one first residual network and one first up-sampling layer.

The first feature reshaping network is configured to reshape a feature vector inputted to the first decoder into a feature map.

Q first image reconstruction networks are configured to perform first feature restoration processing on the feature map to obtain a fused feature image.

Figure 6:
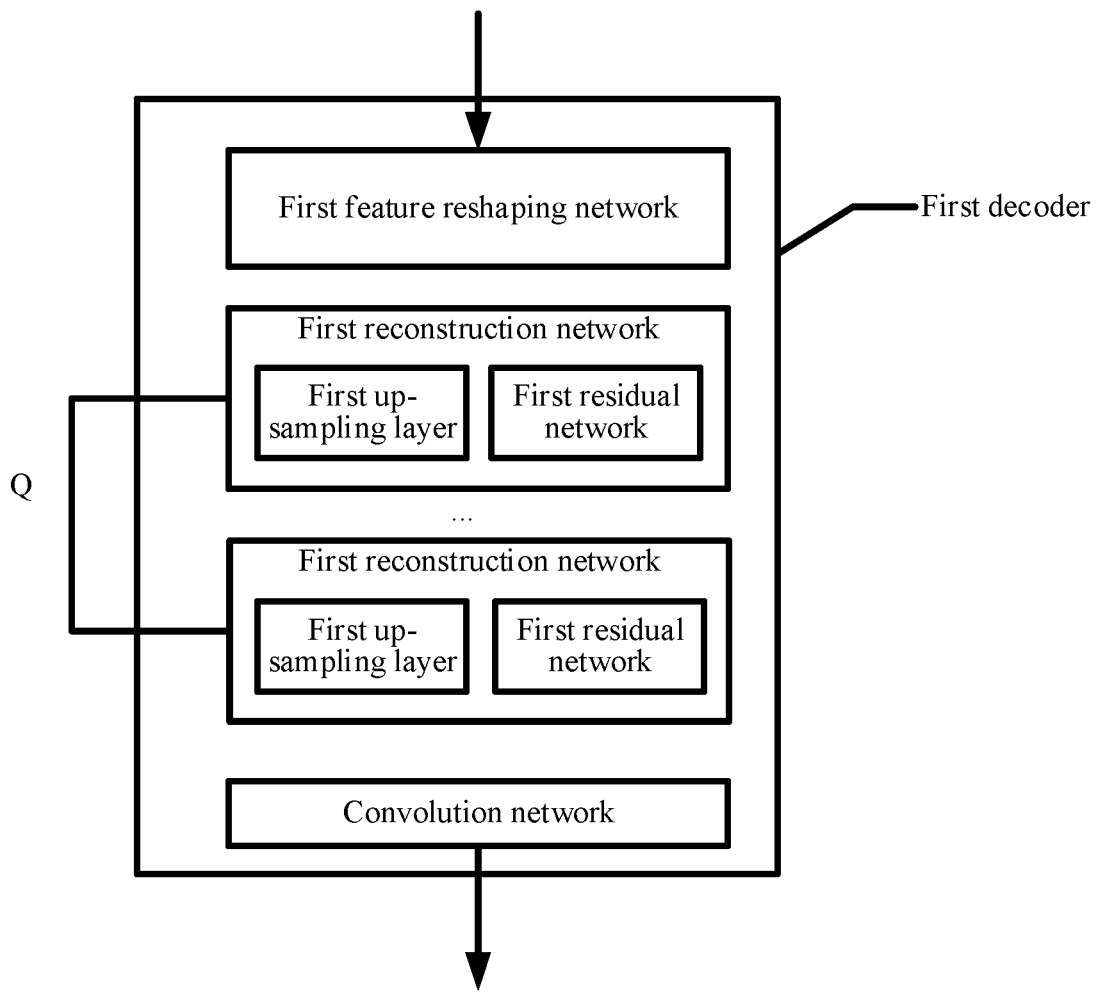
FIG. 6 is a schematic structural diagram of a first decoder according to an exemplary embodiment of this disclosure.

The first convolution network is configured to perform convolution processing on the fused feature image and output a generated image corresponding to the feature vector inputted to the first decoder. Illustratively, FIG. 6 is a schematic structural diagram of a first decoder according to an exemplary embodiment of this disclosure. As shown in FIG. 6, the first decoder includes one first feature reshaping network, Q first image reconstruction networks, and one first convolution network, and Q is a positive integer. Each first image reconstruction network includes one first residual network and one first up-sampling layer. The first feature reshaping network is configured to reshape a feature vector inputted to the first decoder into a feature map. The first image reconstruction network is configured to perform first feature restoration on the feature map, that is, restoring the size of the feature map to be consistent with the size of the first sample image $x_i$ through Q first up-sampling layers (Up Scale Block), and relieving a problem of gradient disappearance existing in an up-sampling process through the first residual network, so as to obtain a fused feature image corresponding to the first sample image. The first convolution network is configured to perform convolution processing on the fused feature image corresponding to the first sample image to obtain a generated image corresponding to the feature vector inputted to the first decoder. On this basis, an implementation of invoking, by the server, the first decoder to decode the first feature vector to obtain the first generated image and the first region segmentation information may include:

reshaping the first feature vector through the feature reshaping network to obtain the first feature map;

performing first feature restoration on the feature map through the Q first image reconstruction networks to obtain the fused feature image corresponding to the first sample image; and performing convolution processing on the fused feature image corresponding to the first sample image through the first convolution network to obtain the first generated image and the first region segmentation information corresponding to the first sample image.

S303. Invoke the first generator to process a second sample image $y_k$ in a second sample set to obtain a second predicted image $y'_k$. The second predicted image $y'_k$ includes a second predicted avatar.

By the same reasoning as the process of encoding the first sample image by the first generator, accordingly, a process of acquiring the second predicted image may be implemented as: after acquiring the second sample image, encoding, by the encoder in the first generator, the second sample image to obtain a second feature vector corresponding to the second sample image, and then, invoking, by the server, the first decoder to decode the second feature vector to obtain the second generation image and second region segmentation information. The second region segmentation information is used for indicating an avatar region in the second generation image. Further, the server extracts a second predicted image $y'_k$ from the second generated image according to the second region segmentation information.

An implementation of invoking, by the server, the encoder to encode the second sample image $y_k$ to obtain the second feature vector may include:

extracting feature information of the second sample image $y_k$ under P different scale parameters through the down-sampling layers (namely, the P down-sampling layers) in the P feature extraction networks; and performing aggregating processing on the feature information of the second sample image $y_k$ under the P scale parameters through the feature aggregation layer to obtain the second feature vector.

By the same reasoning as the process of decoding the first feature vector by the first generator, accordingly, an implementation of invoking, by the server, the first decoder to decode the second feature vector to obtain the second generated image and the second region segmentation information may include:

reshaping the second feature vector through the feature reshaping network to obtain a second feature map;

performing first feature restoration processing on the second feature map through Q first image reconstruction networks to obtain the fused feature image corresponding to the second sample image; and performing convolution processing on the fused feature image corresponding to the second sample image through the first convolution network to obtain the second generated image and the second region segmentation information corresponding to the second sample image.

S304. Invoke a second generator to process a second sample image $y_k$ to obtain a third predicted image $y''_k$. The third predicted image $y''_k$ includes a third predicted avatar. The second generator has the same feature extraction unit as the first generator.

The same feature extraction unit in the second generator and the first generator is an encoder, and the second generator and the first generator have the same structure and parameters. The second generator is used for assisting in the training of the first generator, and further, the second generator is used for assisting in the training of the encoders in the first generator.

In an implementation, the second generator includes an encoder, a second decoder, and an identify recognition network.

The encoder (namely, the same feature extraction structure of the first generator and the second generator) is used for extracting an image feature in a sample image to obtain a feature vector. The identity recognition network is configured to acquire identification information of an image based on a sample image or the feature vector corresponding to the sample image. The identification information may be different identifications (IDs), encoding information, and the like corresponding to different images. The second decoder is configured to generate a predicted image according to the feature vector acquired by the encoder and the identification information provided by the identity recognition network. In a process of generating the third predicted image $y''_k$, the server invokes the encoder to encode the second sample image $y_k$ to obtain the second feature vector corresponding to the second sample image $y_k$. When encoding the second sample image $y_k$, or after encoding the second sample image $y_k$, the server invokes the identity recognition network to perform identity recognition based on the second sample image $y_k$ or the second feature vector corresponding to the second sample image $y_k$ to obtain the identification information corresponding to the second sample image $y_k$ (such as a user ID corresponding to a sample avatar in the second sample image $y_k$). Further, the server invokes the second decoder to decode the second feature vector according to the identification information of the second sample image $y_k$ to obtain a third generated image and third region segmentation information. The third region segmentation information is used for indicating an avatar region in the third generated image. Further, the server extracts a third predicted image $y''_k$ from the third generated image according to the third region segmentation information.

An implementation of invoking, by the server, the encoder to encode the second sample image $y_k$ to obtain the second feature vector may include:

extracting feature information of the second sample image $y_k$ under P different scale parameters through the down-sampling layers (namely, the P down-sampling layers) in the P feature extraction networks; and performing aggregating processing on the feature information of the second sample image $y_k$ under the P scale parameters through the feature aggregation layer to obtain the second feature vector.

Figure 7:
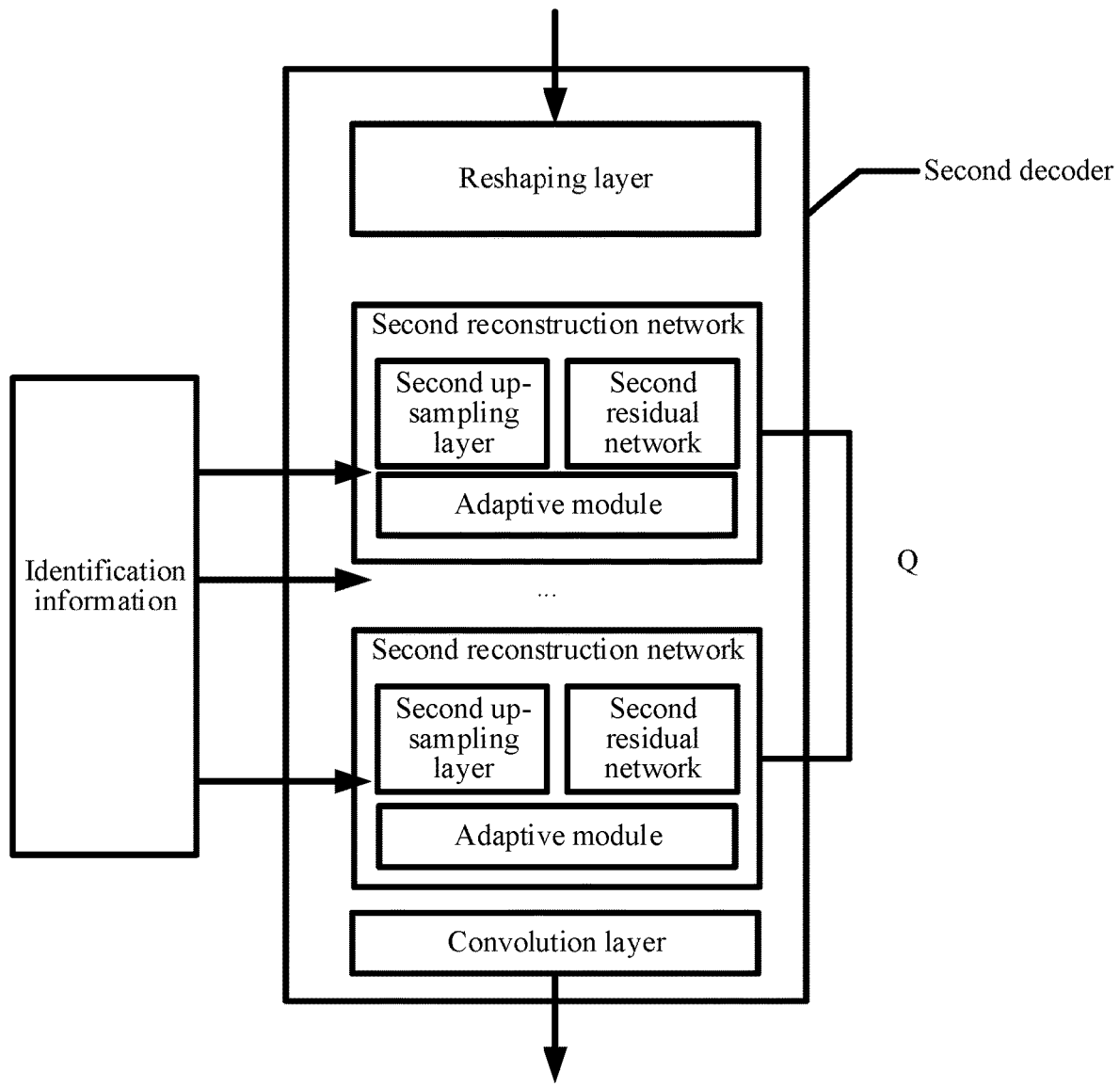
FIG. 7 is a schematic structural diagram of a second decoder according to an exemplary embodiment of this disclosure.

FIG. 7 is a schematic structural diagram of a second decoder according to an exemplary embodiment of this disclosure. As shown in FIG. 7, the second decoder includes one second feature reshaping network, Q second image reconstruction networks (consistent with the quantity of first image reconstruction networks in the first decoder), and one second convolution network, and Q is a positive integer. Each second image reconstruction network includes one second residual network, one second up-sampling layer, and one adaptive module (AdaIN). The second feature reshaping network is configured to reshape the feature vector inputted to the second decoder into a feature map. The second image reconstruction network is configured to perform second feature restoration processing on the feature map, that is, to restore the size of the feature map to be consistent with the size of the second sample image $y_k$ through Q second up-sampling layers. The adaptive module is configured to add the identification information corresponding to the feature vector inputted to the second decoder in the process of up-sampling, so that the second decoder performs feature fusion based on the identification information, and relieving a problem of gradient disappearance existing in an up-sampling process through the second residual network, so as to obtain a fused feature image corresponding to the second sample image. In other words, the adaptive module is configured to acquire a third feature vector corresponding to the identification information based on the identification information of the second sample image $y_k$ in the decoding process of the second decoder. The third feature vector is used for indicating the second decoder to decode the feature vector inputted to the second decoder. The second convolution network is configured to perform convolution processing on the fused feature image corresponding to the second sample image to obtain a generated image corresponding to the feature vector inputted to the second decoder. On this basis, an implementation of invoking, by the server, the second decoder to decode the second feature vector according to the identification information of the second sample image to obtain the third generated image and the third region segmentation information may include:

reshaping the second feature vector through the feature reshaping network to obtain a second feature map;

performing second feature restoration processing on the second feature map through Q second image reconstruction networks to obtain a fused feature image corresponding to the second sample image; and performing convolution processing on the fused feature image corresponding to the second sample image through the second convolution network to obtain the third generated image and the third region segmentation information corresponding to the second sample image.

S305. Determine a function value of a first loss function. The first loss function is used for indicating a difference between the target avatar in the first sample image $x_i$ and the first predicted avatar.

In an implementation, a process of determining the function value of the first loss function may be implemented as:

invoking a first discriminator to respectively discriminate the first sample image $x_i$ and the first predicted avatar;

determining a function value of a first branch function of the first loss function based on a first discrimination result of the first sample image $x_i$ and a second discrimination result of the first predicted avatar, the first discrimination result being used for indicating whether the first sample image $x_i$ is a real image, and the second discrimination result being used for indicating whether the first predicted avatar is a real image;

determining a function value of a second branch function of the first loss function, the second branch function of the first loss function being used for indicating a difference between a first perceptual feature of the target avatar in the first sample image $x_i$ and a second perceptual feature of the first predicted avatar; and determining a sum of the function value of the first branch function of the first loss function and the function value of the second branch function of the first loss function as the function value of the first loss function.

Figure 8:
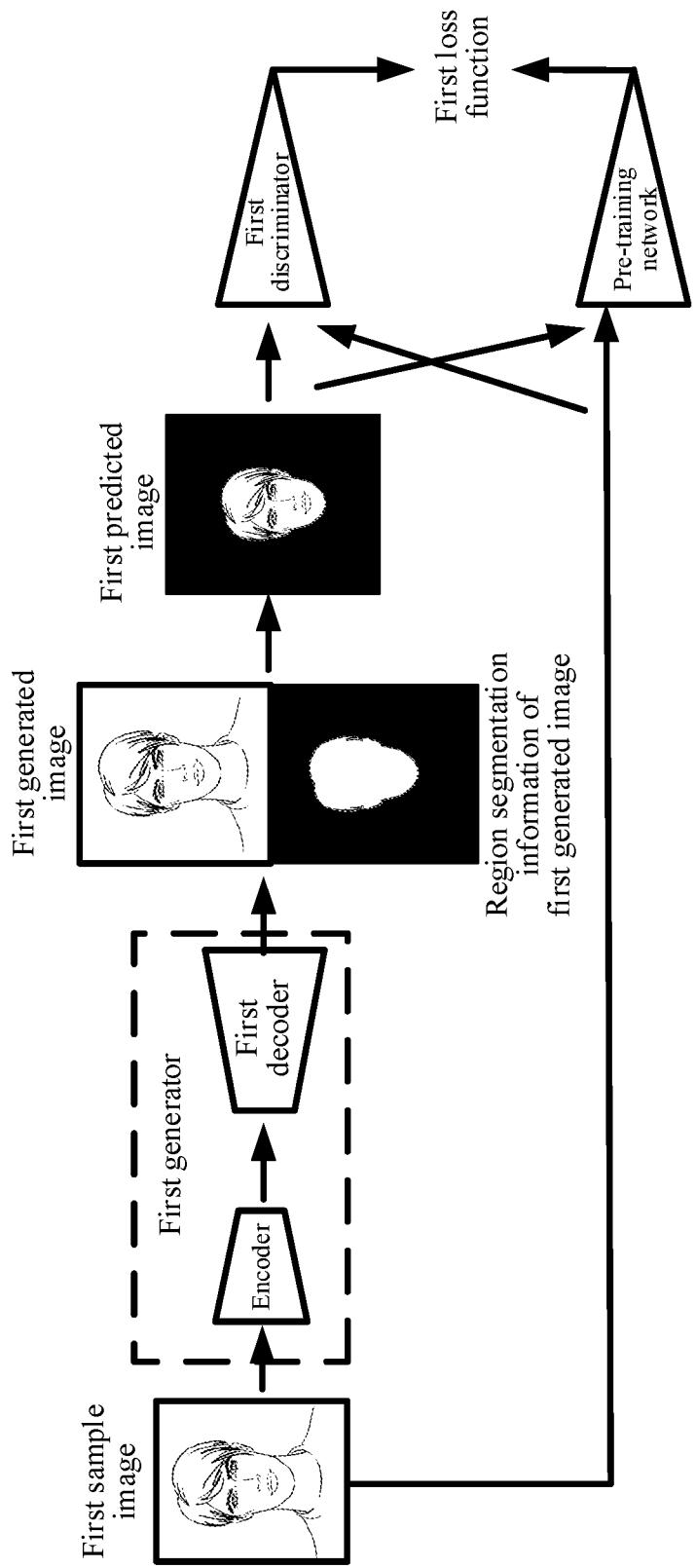
FIG. 8 is a schematic diagram illustrating a determination process of a first loss function according to an exemplary embodiment of this disclosure.

FIG. 8 is a schematic diagram illustrating a determination process of a first loss function according to an exemplary embodiment of this disclosure. As shown in FIG. 8, the server realizes the determination of the function value of the first loss function by invoking the first discriminator (a special discriminator) and a feature perception network. Illustratively, the feature-aware network may be implemented as a learned perceptual image patch similarity (LPIPS) network. An implementation of acquiring the first sample image $x_i$ by the image processing model and processing the first sample image $x_i$ through the first generator to obtain the first predicted image $x'_i$ may refer to step S302 as described in the other embodiments herein.

After obtaining the first predicted image $x'_i$, on one hand, the server respectively discriminates the first sample image $x_i$ and the first predicted image $x'_i$ through the first discriminator, namely, respectively judges whether the first sample image $x_i$ and the first predicted image $x'_i$ are real images, and determines the function value of the first branch function of the first loss function based on a first discrimination result of the first sample image $x_i$ and a second discrimination result of the first predicted image $x'_i$. The first branch function may be expressed as:

$$L_{GAN1} = \min_{G1} \max_{D1} E[\log(D_{src}(I_{src}))] + E[\log(1 - D_{src}(Dec_{src}(Enc(I_{src}))))]$$

Where, $L_{GAN1}$ represents the first branch function of the first loss function of a first GAN (including a first generator (G1) and a first discriminator (D1)), $$\min_{G1}$$

represents minimizing a difference between the first predicted image $x'_i$ generated by the first generator (G) and the first sample image $x_i$, $$\max_{D1}$$

represents maximizing a difference between a discrimination result of the first predicted image $x'_i$ by the first discriminator and a discrimination result of the first sample image $x_i$, E(x) function is used for finding the expectation of x, $D_{src}(x)$ is used for representing discriminating x by using the first discriminator, $I_{src}$ is the first sample image, that is, $x_i$, Enc(x) is used for representing encoding x by using the encoder, and $Dec_{src}(x)$ is used for representing decoding x by using the first decoder. Thus, it can be inferred that, $D_{src}(I_{src})$ represents discriminating the first sample image $x_i$ by using the first discriminator, $Dec_{src}(Enc(I_{src}))$ is the first predicted image, that is, $x'_i$, and $D_{src}(Dec_{src}(Enc(I_{src})))$ represents discriminating the first predicted image, that is, $x'_i$, by using the first discriminator.

On the other hand, the server performs feature perception on the first sample image $x_i$ and the first predicted image $x'_i$ through the LPIPS network to obtain a first perceptual feature corresponding to the first sample image $x_i$ and a second perceptual feature corresponding to the first predicted image $x'_i$, and performs feature comparison on the first perceptual feature and the second perceptual feature to obtain a first feature comparison result. The first feature comparison result is used for reflecting a feature difference between the first sample image $x_i$ and the first predicted image $x'_i$. After obtaining the first feature comparison result, the server determines the function value of the second branch function of the first loss function based on the first feature comparison result. The second branch function may be expressed as:

$$L_{LPIPS1}=[LPIPS(Dec_{src}(Enc(I_{src})))-LPIPS(I_{src})]^2$$

Where, $L_{LPIPS1}$ represents the second branch function of the first loss function corresponding to the LPIPS network, and LPIPS(x) represents performing feature perception on x through the LPIPS network. It can be known from the first branch function of the first loss function that $I_{src}$ is the first sample image, that is, $x_i$, and $Dec_{src}(Enc(I_{src}))$ is the first predicted image, that is, $x'_i$. On this basis, $LPIPS(Dec_{src}(Enc(I_{src})))$ represents performing feature perception on the first predicted image, that is, $x'_i$, through the LPIPS network, and $LPIPS(I_{src})$ represents performing feature perception on the first sample image $x_i$ through the LPIPS network.

After obtaining the function value of the first branch function of the first loss function and the function value of the second branch function of the first loss function, the server determines a sum of the function value of the first branch function of the first loss function and the function value of the second branch function of the first loss function as the function value of the first loss function. The first loss function $L_1$ may be expressed as:

$$L_1=L_{GAN1}+L_{LPIPS1}$$

S306. Determine a function value of a second loss function. The second loss function is used for indicating a difference between the first type attribute of the sample avatar in the second sample image $y_k$ and the first type attribute of the second predicted avatar.

In an implementation, a process of determining the function value of the second loss function may be implemented as:

invoking a first discriminator to discriminate the second predicted avatar;

determining a function value of a first branch function of the second loss function based on a third discrimination result of the second predicted avatar, the third discrimination result being used for indicating whether the second predicted avatar is a real image;

performing attribute comparison on the first type attribute of the sample avatar in the second sample image $y_k$ and the first type attribute of the second predicted avatar to obtain an attribute comparison result;

determining the function value of a second branch function of the second loss function based on the attribute comparison result; and determining a sum of the function value of the first branch function of the second loss function and the function value of the second branch function of the second loss function as the function value of the second loss function.

Figure 9:
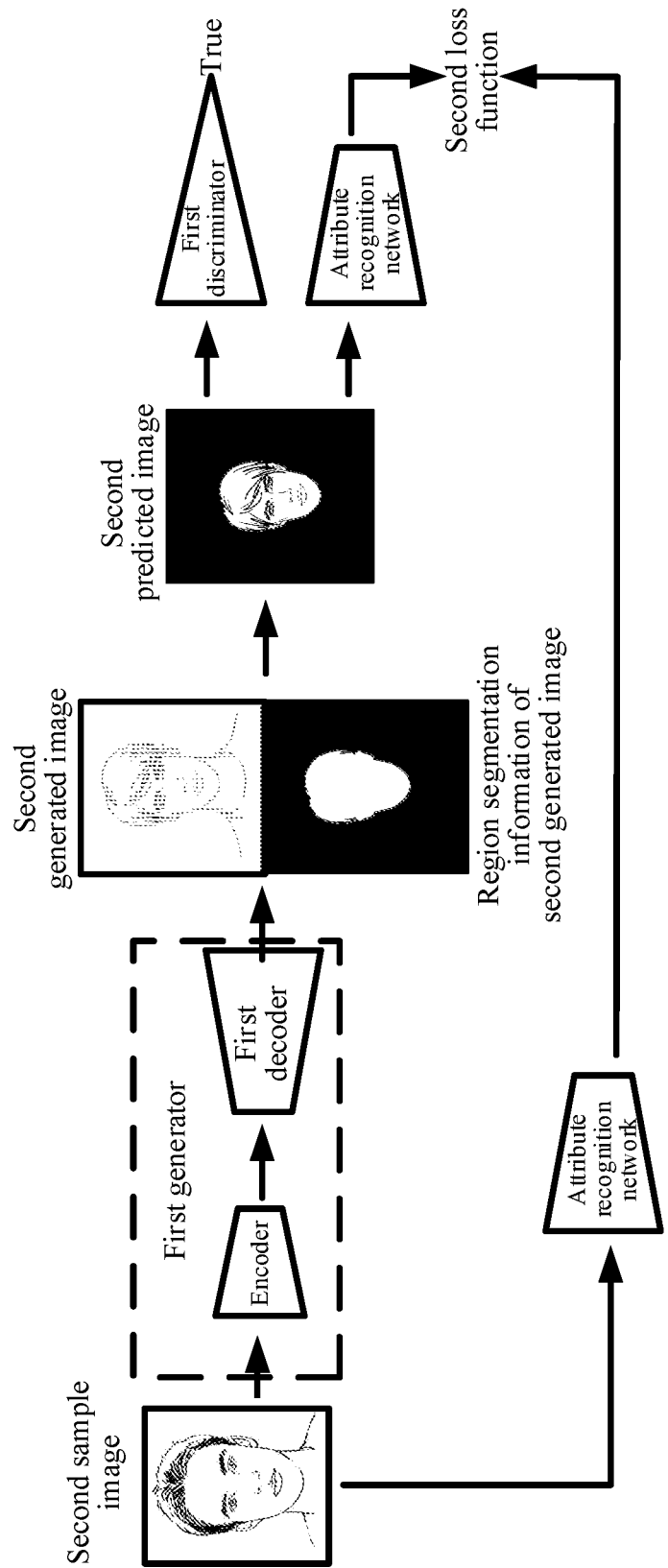
FIG. 9 is a schematic diagram illustrating a determination process of a first loss function according to an exemplary embodiment of this disclosure.

FIG. 9 is a schematic diagram illustrating a determination process of a second loss function according to an exemplary embodiment of this disclosure. As shown in FIG. 9, the server realizes the determination of the function value of the second loss function by invoking an attribute recognition network and the first discriminator. The attribute recognition network may recognize expression attributes, such as an eye size, an eyeball position, and a mouth size, for indicating a facial expression. The attribute recognition network outputs a continuous value in the range of [0, 1]. For example, for the eye size, 0 indicates a closed eye and 1 indicates a fully open eye. For the eyeball position, 0 indicates a bias towards the leftmost side and 1 indicates a bias towards the rightmost side. For the mouth size, 0 indicates a closed mouth and 1 indicates a fully open mouth. An implementation of acquiring the second sample image $y_k$ by the image processing model and processing the second sample image $y_k$ through the first generator to obtain the second predicted image $y'_k$ may refer to step S303 as described in the other embodiments herein.

After obtaining the second predicted image $y'_k$, on one hand, the server discriminates the second predicted image $y'_k$ through the first discriminator, that is, judges whether the second predicted image $y'_k$ is a real image, and determines the function value of the first branch function of the second loss function based on the third discrimination result of the second predicted image $y'_k$. The first branch function may be expressed as:

$$L_{GAN2} = \min_{G1} E[\log(1 - D_{src}(Dec_{src}(Enc(I_{other}))))]$$

Where, $L_{GAN2}$ represents the first branch function of the second loss function of the first GAN (including the first generator (G1) and the first discriminator (D1)), $$\min_{G1}$$

represents minimizing a difference between the second predicted image $y'_k$ generated by the first generator (G) and the second sample image $y_k$ (so that a discrimination result of the second predicted image $y'_k$ by the first discriminator is true), E(x) function is used for finding the expectation of x, $D_{src}(x)$ is used for representing discriminating x by using the first discriminator, $I_{other}$ is the second sample image $y_k$, Enc(x) is used for representing encoding x by using the encoder, and $Dec_{src}(x)$ is used for representing decoding x by using the first decoder. Thus, it can be inferred that, $Dec_{src}(Enc(I_{other}))$ is the second predicted image $y'_k$, and $D_{src}(Dec_{src}(Enc(I_{other})))$ represents that the second predicted image $y'_k$ is discriminated by using the first discriminator.

On the other hand, the server performs attribute feature extraction on the second sample image $y_k$ and the second predicted image $y'_k$ through the attribute recognition network to obtain a first type attribute corresponding to the second sample image and a first type attribute of the first predicted image, and performs attribute comparison on the first type attribute of the second sample image and the first type attribute of the first predicted image to obtain an attribute comparison result. The attribute comparison result is used for reflecting the attribute difference between the second sample image $y_k$ and the second predicted image $y'_k$. The function value of the second loss function is determined based on the attribute comparison result. The second loss function may be expressed as:

$$L_{attri}=[N_{attri}(Dec_{src}(Enc(I_{other})))-N_{attri}(I_{other})]^2$$

Where, $L_{attri}$ represents a loss function of the attribute recognition network, and $N_{attri}(X)$ represents performing attribute recognition on x by the attribute recognition network. It can be known from the first branch function of the second loss function that $I_{other}$ is the second sample image $y_k$, and $Dec_{src}(Enc(I_{other}))$ is the second predicted image $y'_k$. On this basis, $N_{attri}(Dec_{src}(Enc(I_{other})))$ represents performing attribute feature extraction on the second predicted image $y'_k$ through the attribute recognition network, and $N_{attri}(I_{other})$ represents performing attribute feature extraction on the second sample image $y_k$ through the attribute recognition network.

After obtaining the function value of the first branch function of the second loss function and the function value of the second branch function of the second loss function, the server determines a sum of the function value of the first branch function of the second loss function and the function value of the second branch function of the second loss function as the function value of the second loss function. The second loss function $L_2$ may be expressed as:

$$L_2 = L_{GAN2} + L_{attri}$$

S307. Determine a function value of a third loss function. The third loss function is used for indicating a difference between the sample avatar in the second sample image $y_k$ and a third predicted avatar.

In an implementation, a process of determining the function value of the third loss function may be implemented as:
 invoking a second discriminator to respectively discriminate the second sample image $y_k$ and the third predicted avatar;
 determining a function value of a first branch function of the third loss function based on a fourth discrimination result of the second sample image $y_k$ and a fifth discrimination result of the third predicted avatar, the fourth discrimination result being used for indicating whether the second sample image $y_k$ is a real image, and the fifth discrimination result being used for indicating whether the third predicted avatar is a real image;
 determining a function value of a second branch function of the third loss function, the second branch function of the third loss function being used for indicating a difference between a third perceptual feature of the sample avatar in the second sample image $y_k$ and a fourth perceptual feature of the third predicted avatar; and
 determining a sum of the function value of the first branch function of the third loss function and the function value of the second branch function of the third loss function as the function value of the third loss function.

Figure 10:
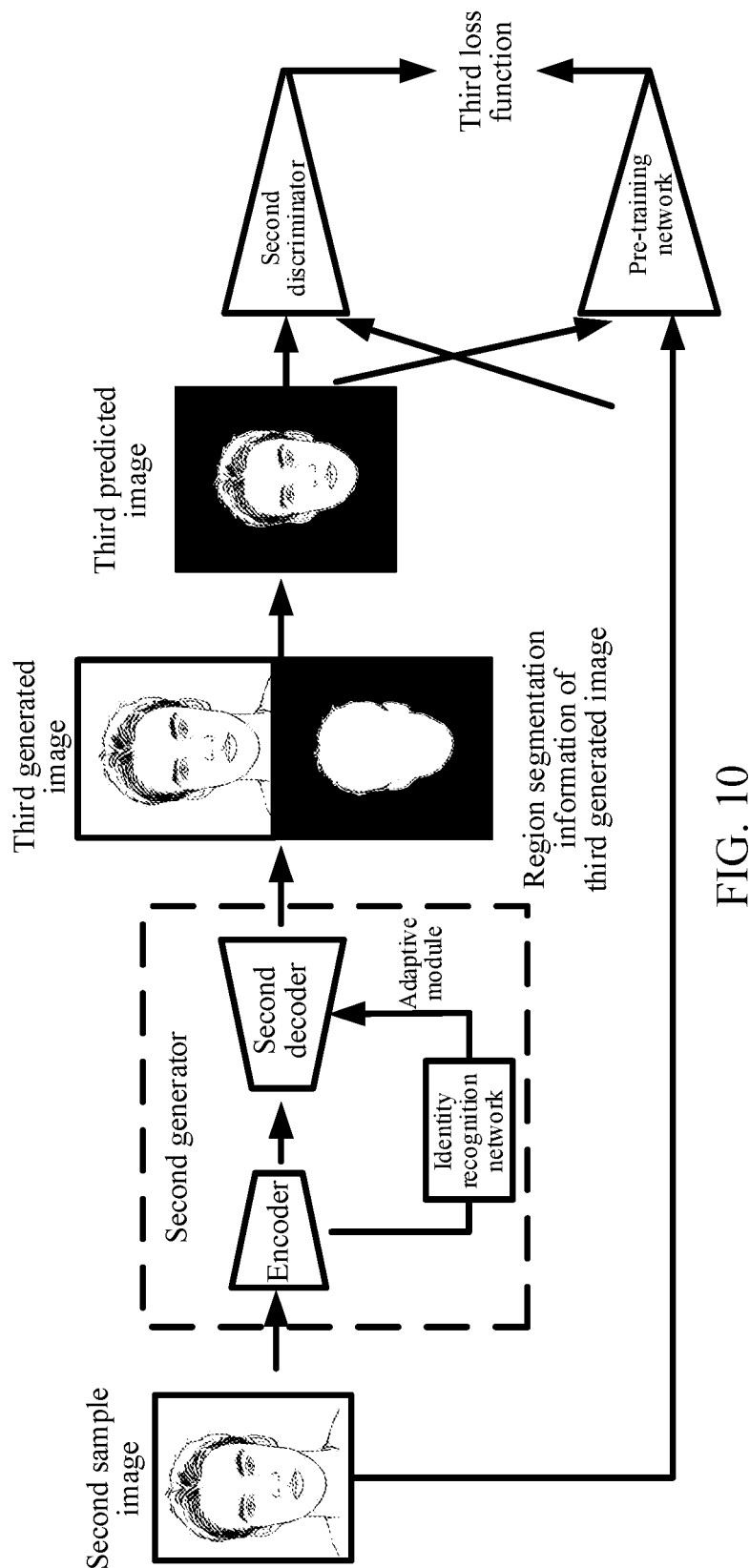
FIG. 10 is a schematic diagram illustrating a determination process of a first loss function according to an exemplary embodiment of this disclosure.

FIG. 10 is a schematic diagram illustrating a determination process of a third loss function according to an exemplary embodiment of this disclosure. As shown in FIG. 10, the server realizes the determination of the function value of the third loss function by invoking the second discriminator (a generalized discriminator), an identity recognition network, and a feature perception network. An implementation of processing the second sample image $y_k$ by the image processing model through the second generator to obtain the third predicted image $y''_k$ may refer to step S304 as described in the other embodiments herein.

After obtaining the third predicted image $y''_k$, on one hand, the server respectively discriminates the second sample image $y_k$ and the third predicted image $y''_k$ through the second discriminator, that is, respectively judges whether the second sample image $y_k$ and the third predicted image $y''_k$ are real images, and determines the function value of the first branch function of the third loss function based on a fourth discrimination result of the second sample image $y_k$ and a fifth discrimination result of the third predicted image $y''_k$. The first branch function may be expressed as:

$$L_{GAN3} = \min_{G2} \max_{D2} E[\log(D_{general}(I_{other}))] +$$

-continued
$$E[\log(1 - D_{general}(Dec_{general}(Enc(I_{other}), N_{id}(I_{other}))))]$$

Where, $L_{GAN3}$ represents the first branch function of the third loss function of the second GAN' (including a second generator (G2) and the second discriminator (D2)), $$\min_{G2}$$

represents minimizing a difference between the third predicted image $y''_k$ generated by the second generator (G) and the second sample image $y_k$, $$\max_{D2}$$

represents maximizing a difference between a discrimination result of the third predicted image $y''_k$ by the second discriminator and a discrimination result of the second sample image $y_k$, $E(x)$ function is used for finding the expectation of x, $D_{general}(x)$ is used for representing performing discrimination on x by using the first discriminator, $I_{other}$ is the second sample image $y_k$, $Enc(x)$ is used for representing encoding x by using the encoder, and $Dec_{general}(x, y)$ is used for representing decoding x by using the second decoder according to y. Thus, it can be inferred that $D_{general}(I_{other})$ represents discriminating the second sample image $y_k$ by using the second discriminator, $Dec_{general}(Enc(I_{other}), N_{id}(I_{other}))$ is the third predicted image $y''_k$, and $D_{general}(Dec_{general}(Enc(I_{other}), N_{id}(I_{other})))$ represents discriminating the third predicted image $y''_k$ by using the second discriminator.

On the other hand, the server performs feature perception on the second sample image $y_k$ and the third predicted image $y''_k$ through the LPIPS network to obtain a third perceptual feature corresponding to the second sample image $y_k$ and a fourth perceptual feature corresponding to the third predicted image $y''_k$, and performs feature comparison on the third perceptual feature and the fourth perceptual feature to obtain a second feature comparison result. The second feature comparison result is used for reflecting a feature difference between the second sample image $y_k$ and the third predicted image $y''_k$. After obtaining the second feature comparison result, the server determines a second branch function of the third loss function based on the second feature comparison result. The second branch function may be expressed as:

$$L_{LPIPS2} = [LPIPS(Dec_{general}(Enc(I_{other}))) - LPIPS(I_{other})]^2$$

Where, $L_{LPIPS2}$ represents a second branch function of a third loss function of the LPIPS network, and $LPIPS(x)$ represents performing feature perception on x through the LPIPS network. It can be known from the first branch function of the third loss function that $I_{other}$ is a second sample image, that is, $y_k$, and $Dec_{general}(Enc(I_{other}))$ is a third predicted image $y''_k$. On this basis, $LPIPS(Dec_{general}(Enc(I_{other})))$ represents performing feature perception on the third predicted image, that is, $y''_k$, through the LPIPS network, and $LPIPS(I_{other})$ represents performing feature perception on the second sample image $y_k$ through the LPIPS network.

After obtaining the function value of the first branch function of the third loss function and the function value of the second branch function of the third loss function, the server determines a sum of the function value of the first branch function of the third loss function and the function value of the second branch function of the third loss function as the function value of the third loss function. The third loss function $L_3$ may be expressed as:

$$L_3 = L_{GAN3} + L_{LPIPS2}$$

S308. Determine a function value of a target loss function based on the function value of the first loss function, the function value of the second loss function, and the function value of the third loss function.

In some implementations, in a model training process, the function value of the target loss function of the image processing model may be determined based on the function value of the first loss function and the function value of the second loss function.

Taking the training based on a value of the third loss function as an example, the target loss function may be expressed as:

$$L_{total} = L_1 + L_2 + L_3$$

in some implementations, the function value of the target loss function may be a sum of the function value of the first loss function, the function value of the second loss function, and the function value of the third loss function, or the function value of the target loss function may be a result obtained by performing weighting and summing on the function value of the first loss function, the function value of the second loss function, and the function value of the third loss function. The weights of every two of the three function values may be the same as or different from each other. Illustratively, the target loss function may be expressed as:

$$L_{total} = aL_1 + bL_2 + cL_3$$

Where, a represents a weight value corresponding to the first loss function, b represents a weight value corresponding to the second loss function, and c represents a weight value corresponding to the third loss function. The values of every two of the three weight values may be the same as or different from each other, and a+b+c=1.

In an implementation, processes of calculating the first loss function, the second loss function, and the third loss function may be performed simultaneously.

S309. Train the image processing model according to the function value of the target loss function.

In an implementation, the server adjusts parameters of the image processing model (for example, the number of convolution layers, the number of up-sampling layers, the number of down-sampling layers, and dilation) to reduce the loss value of a total loss function. Illustratively, the server feeds back an error to the first generator and second generator (the encoder and the decoder) through back propagation according to the function value of the target loss function, and updates parameter values of the first generator and the second generator by using a gradient descent method. In some implementations, during model training, a part to be subjected to parameter updating includes: an encoder, a specific decoder, a generalized decoder, a specific discriminator, and a generalized discriminator. The LPIPS network, the identity recognition network, and the attribute recognition network do not participate in parameter updating.

In an implementation, when adjusting the parameters of the image processing model, the server may adjust the parameters of the first generator through $L_1+L_2$, and adjust the parameters of the second generator through $L_3$.

In a training process of the image processing model, each time the parameters are updated, the server will judge whether the updated image processing model reaches a training completion condition, iterates, if the updated image processing model does not reach the training completion condition, according to the above step S302 to step S309, and continues to train the image processing model until the image processing model reaches the training completion condition, or ends, if the updated image processing model reaches the training completion condition, the training of the image processing model.

In some implementations, in addition to the first generator, the image processing model in the embodiment of this disclosure may further include a second generator, a first discriminator, a second discriminator, a feature perception network, an identity recognition network, and an attribute recognition network. In the model training process, parameters of the first generator, the second generator, the first discriminator, and the second discriminator are all updated. After the training of the image processing model is ended, the first generator is retained, that is to say, the image processing model reaching the training completion condition includes the first generator after the training is ended.

Or, the image processing model of this application includes a first generator. In the model training process, other network structures other than the image processing model are invoked to assist the training of the image processing model. After the training completion condition is reached, the trained image processing model is acquired for application.

When the first type attribute is a non-identity recognition attribute and the second type attribute is an identity recognition attribute, an input image is processed through the trained image processing model, and an obtained predicted image may be an image which retains the non-identity recognition attribute of an avatar in the input image but has the identity recognition attribute of a target avatar. Illustratively, the feature attributes, such as an expression, a posture, and illumination, of the avatar in the predicted image are consistent with those of the input image, and the appearance features, such as facial features, skin, hair, and glasses, of the predicted image are consistent with those the target avatar.

Figure 11:
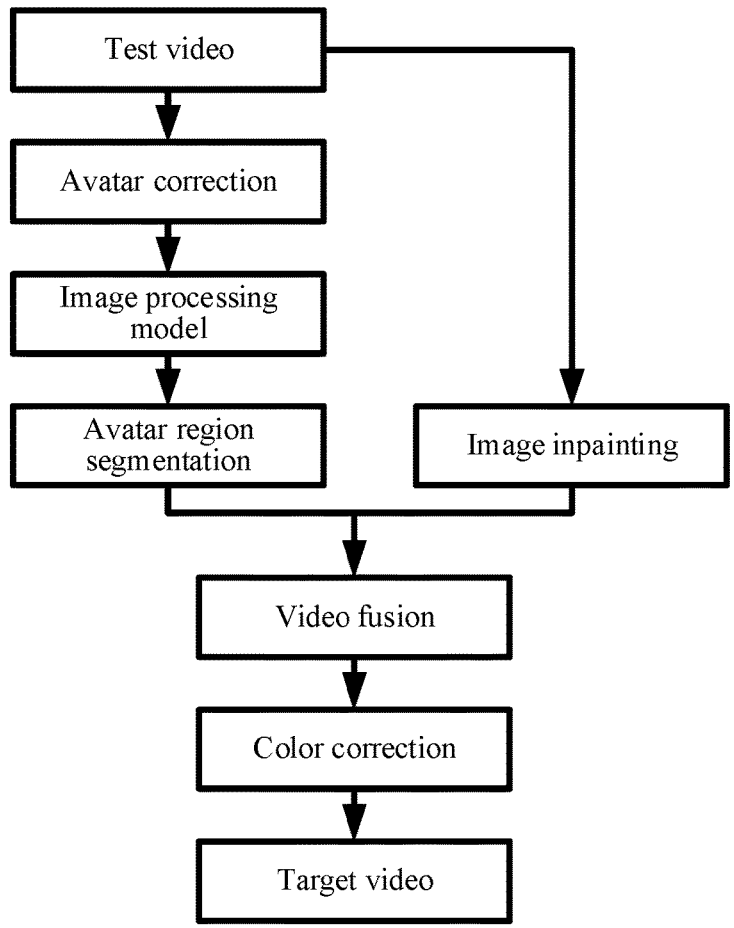
FIG. 11 is a flowchart illustrating processing of a test video according to an exemplary embodiment of this disclosure.

Illustratively, the trained image processing model may be applied in a video avatar replacement scenario. Taking a process of performing avatar replacement processing on a test video by a server as an example, FIG. 11 is a flowchart illustrating processing of a test video according to an exemplary embodiment of this disclosure. As shown in FIG. 11, the server acquires the test video. The test video includes R frames of test images, each frame of test image includes a corrected avatar, and R is a positive integer.

A first generator of the trained image processing model invoked to respectively process the R frames of test images to obtain predicted images respectively corresponding to the R frames of test images. The R frames of predicted images include a target avatar of a target user, and the first type attribute of the avatar in the R frames of predicted images is consistent with the first type attribute of the corrected avatar in the corresponding test image.

Image inpainting is performed on the R frames of test images from which the corrected avatar is deleted in the test video.

The R frames of predicted images are respectively fused with corresponding test images in the image-inpainted test video to obtain a target video.

On one hand, the server performs image frame extraction (image extraction) on the test video to obtain a test image set. Each frame of test image includes a test avatar. The server corrects the test avatar in the test image set, and a manner of correcting the test avatar may refer to an implementation in S3012 as described in the other embodiments herein. After the correction is completed, the server invokes an avatar replacement model to respectively process each frame of test image to obtain a predicted image corresponding to each frame of test image. The avatar in the predicted image may include a first type attribute of an original avatar and a second type attribute of the avatar corresponding to the target user included in the first sample image when the image processing model is trained.

Figure 12:
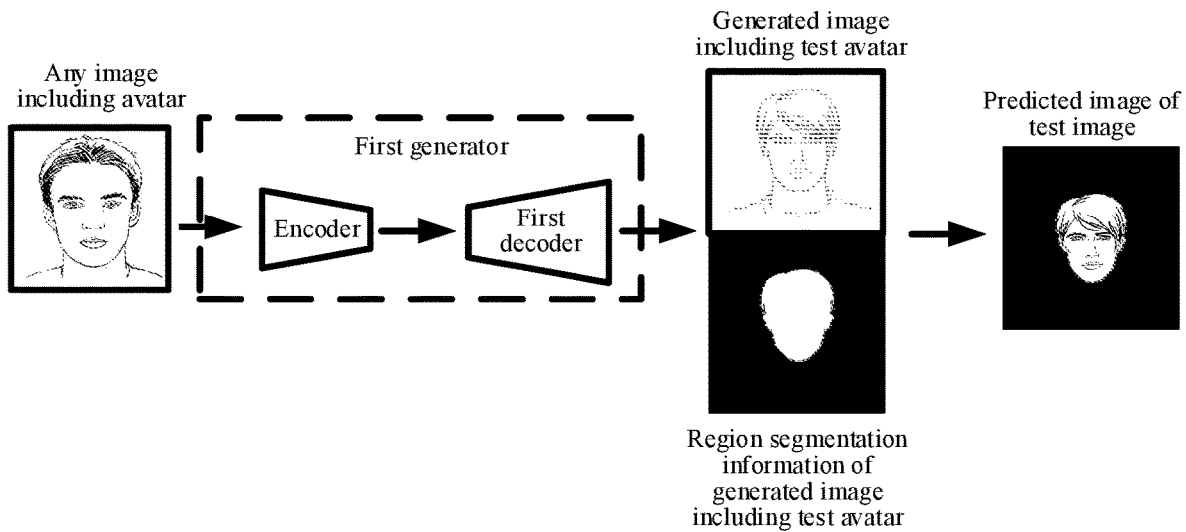
FIG. 12 is a flowchart illustrating generation processing of a test image by a first generator according to an exemplary embodiment of this disclosure.

In some implementations, after obtaining the predicted avatar corresponding to each frame of test image, the avatar in each frame of test image may be replaced. FIG. 12 is a flowchart illustrating generation processing of a test image by a trained image processing model according to an exemplary embodiment of this disclosure. In FIG. 12, an implementation of processing, by the server, each frame of test image by using the trained image processing model respectively to obtain a predicted image corresponding to each frame of test image may refer to S302 or S303 as described in the other embodiments herein.

On the other hand, taking a process of performing avatar reshaping on an image in a test video being processed by a server as an example, the server needs to delete a corrected avatar in a test image in the test video, and performs image inpainting processing on R frames of test images obtained after the corrected avatar is deleted from the test video, which has the purpose of inpainting a missing region (namely, an avatar change region) of an image to be inpainted according to the image to be inpainted itself (such as a background) or image library information after the original avatar is deleted from the test image, so that the inpainted image looks relatively natural.

Figure 13:
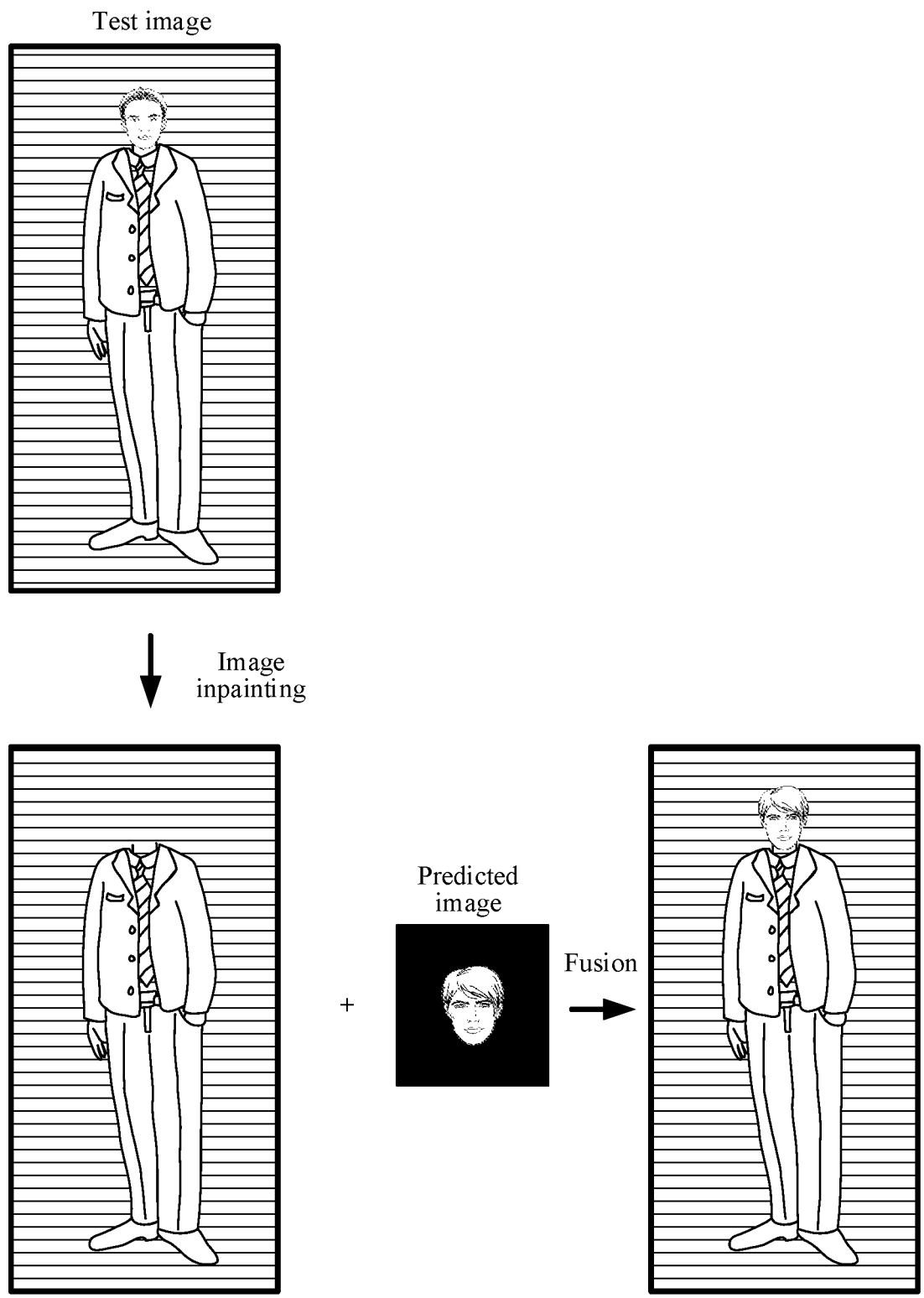
FIG. 13 is a flowchart illustrating processing of a test video according to an exemplary embodiment of this disclosure.

FIG. 13 is a flowchart illustrating processing of a test video according to an exemplary embodiment of this disclosure. As shown in FIG. 13, the server fuses each frame of predicted image with a corresponding image-inpainted test image to obtain a target video.

In some implementations, the server may perform color correction (for example, skin tone adjustment) on the fused video, so that the obtained target video is more realistic.

In one embodiment, a user may upload a song or dance video. The server may replace the avatar in the video uploaded by the user with a star avatar/a cartoon avatar or the like (as an avatar of a target user) by using the trained image processing model, so as to obtain an avatar-reshaped target video, thereby improving the interest of the video. In addition, the user may also perform "avatar changing" live broadcast (that is, reshaping an avatar of a live broadcast user into the avatar of the target user in real time) through the trained image processing model, thereby improving the interest of live broadcast.

In another embodiment, since mobile payment may be performed by "face swiping", this requires higher accuracy of a face recognition model. The trained image processing model may be configured to generate training data (attack data) to train the face recognition model (that is, to train the ability of the face recognition model to recognize the reality of the predicted avatar), thereby improving the reliability and the security of the mobile payment.

In the embodiment of this disclosure, by the image processing method according to the embodiment of this disclosure, the image processing model including the first generator is trained by using a first sample set of a first sample image including the target avatar of the same target user and a second sample set of a second sample image including a sample avatar, and in the training process, the image processing model is trained through an avatar difference between the first sample image and a first predicted image obtained by processing the first sample image through the first generator, and a first type attribute difference between the second sample image and a second predicted image obtained by processing the second sample image through the first generator, so that the trained image processing model can replace an avatar in an input image with the target avatar, and retain the first type attribute of the avatar in the input image. The image processing model obtained based on this disclosure can retain a specified attribute of the replaced avatar while replacing the avatar, so that the reality of the replaced avatar is high, and the accuracy and the replacement effect of image processing are improved.

The methods of the embodiments of this disclosure are described in detail above. In order to facilitate better implementation of the above solution of the embodiments of this disclosure, an apparatus of the embodiments of this disclosure is accordingly provided as follows.

Figure 14:
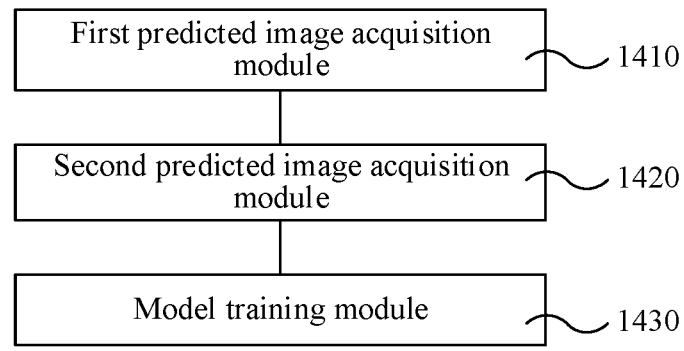
FIG. 14 is a schematic structural diagram of an image processing apparatus according to an exemplary embodiment of this disclosure.

FIG. 14 is a schematic structural diagram of an image processing apparatus according to an exemplary embodiment of this disclosure. The image processing apparatus may be carried in the server 102 shown in FIG. 1. The image processing apparatus shown in FIG. 14 may be configured to perform part or all functions in the method embodiments described in FIG. 2 and FIG. 3 above. The image processing apparatus includes:

a first predicted image acquisition module 1410, configured to invoke a first generator in an image processing model to process a first sample image $x_i$ in a first sample set to obtain a first predicted image $x'_i$, the first predicted image $x'_i$ including a first predicted avatar, the first sample set including N first sample images, each first sample image including a target avatar corresponding to the same target user, N being a positive integer, i being a positive integer, and i≤N;

a second predicted image acquisition module 1420, configured to invoke the first generator to process a second sample image $y_k$ in a second sample set to obtain a second predicted image $y'_k$, the second predicted image $y'_k$ including a second predicted avatar, the second sample set including M second sample images, each second sample image including a sample avatar, M being a positive integer, k being a positive integer, and k≤M; and a model training module 1430, configured to train the image processing model according to a difference between the target avatar in the first sample image $x_i$ and the first predicted avatar and a difference between a first type attribute of the sample avatar in the second sample image $y_k$ and the first type attribute of the second predicted avatar. The image processing model is configured to replace an avatar in an input image with the target avatar and retain the first type attribute of the avatar in the input image.

In an implementation, the model training module 1430 includes:

a first determination sub-module, configured to determine a function value of a first loss function, the first loss function being used for indicating a difference between the target avatar in the first sample image $x_i$ and the first predicted avatar;

a second determination sub-module, configured to determine a function value of a second loss function, the second loss function being used for indicating a difference between a first type attribute of the sample avatar in the second sample image $y_k$ and the first type attribute of the second predicted avatar;

a third determination sub-module, configured to determine a function value of a target loss function of the image processing model based on the function value of the first loss function and the function value of the second loss function; and a model training sub-module, configured to train the image processing model according to the function value of the target loss function.

In an implementation, the first determination sub-module is configured to:

invoke a first discriminator to respectively discriminate the first sample image $x_i$ and the first predicted avatar;

determine a function value of a first branch function of the first loss function based on a first discrimination result of the first sample image $x_i$ and a second discrimination result of the first predicted avatar, the first discrimination result being used for indicating whether the first sample image $x_i$ is a real image, and the second discrimination result being used for indicating whether the first predicted avatar is a real image;

determine a function value of a second branch function of the first loss function, the second branch function of the first loss function being used for indicating a difference between a first perceptual feature of the target avatar in the first sample image $x_i$ and a second perceptual feature of the first predicted avatar; and determine a sum of the function value of the first branch function of the first loss function and the function value of the second branch function of the first loss function as the function value of the first loss function.

In an implementation, the second determination sub-module is configured to:

invoke a first discriminator to discriminate the second predicted avatar;

determine a function value of a first branch function of the second loss function based on a third discrimination result of the second predicted avatar, the third discrimination result being used for indicating whether the second predicted avatar is a real image;

performing attribute comparison on the first type attribute of the sample avatar in the second sample image $y_k$ and the first type attribute of the second predicted avatar to obtain an attribute comparison result;

determine a second branch function of the second loss function based on the attribute comparison result; and determine a sum of the function value of the first branch function of the second loss function and the function value of the second branch function of the second loss function as the function value of the second loss function.

In an implementation, the apparatus further includes:

a third predicted image acquisition module, configured to invoke a second generator to process the second sample image $y_k$ to obtain a third predicted image $y''_k$, the third predicted image $y''_k$ including a third predicted avatar. The second generator and the first generator have the same feature extraction unit.

The model training module 1430 further includes:

a fourth determination sub-module, configured to determine a function value of a third loss function, the third loss function being used for indicating a difference between the sample avatar in the second sample image $y_k$ and the third predicted avatar.

The third determination sub-module is configured to determine the function value of the target loss function based on the function value of the first loss function, the function value of the second loss function, and the function value of the third loss function.

In an implementation, the fourth determination sub-module is configured to:

invoke a second discriminator to respectively discriminate the second sample image $y_k$ and the third predicted avatar;

determine a function value of a first branch function of the third loss function based on a fourth discrimination result of the second sample image $y_k$ and a fifth discrimination result of the third predicted avatar, the fourth discrimination result being used for indicating whether the second sample image $y_k$ is a real image, and the fifth discrimination result being used for indicating whether the third predicted avatar is a real image;

determine a function value of a second branch function of the third loss function, the second branch function of the third loss function being used for indicating a difference between a third perceptual feature of the sample avatar in the second sample image $y_k$ and a fourth perceptual feature of the third predicted avatar; and determine a sum of the function value of the first branch function of the third loss function and the function value of the second branch function of the third loss function as the function value of the third loss function.

In an implementation, the first generator includes an encoder and a first decoder.

The first predicted image acquisition module 1410 is configured to:

invoke the encoder to encode the first sample image $x_i$ to obtain a first feature vector;

invoke the first decoder to decode the first feature vector to obtain a first generated image and first region segmentation information, the first region segmentation information being used for indicating an avatar region in the first generated image; and extract the first predicted image $x'_i$ from the first generated image according to the first region segmentation information.

In an implementation, the first generator includes an encoder and a first decoder.

The second predicted image acquisition module 1420 is configured to:

invoke the encoder to encode the second sample image $y_k$ to obtain a second feature vector;

invoke the first decoder to decode the second feature vector to obtain a second generated image and second region segmentation information, the second region segmentation information being used for indicating an avatar region in the second generated image; and extract a second predicted image from the second generated image $y'_k$ according to the second region segmentation information.

In an implementation embodiment, the encoder includes P feature extraction networks and a feature aggregation layer, and P is a positive integer. Each feature extraction network includes one down-sampling layer. Scale parameters of the P down-sampling layers are different.

The P down-sampling layers are configured to extract feature information of an image inputted to the encoder under P scale parameters.

The feature aggregation layer is configured to aggregate the feature information under the P scale parameters to obtain a feature vector corresponding to the image inputted to the encoder.

In an implementation, the first decoder includes one first feature reshaping network, Q first image reconstruction networks, and one first convolution network, and Q being a positive integer. Each first image reconstruction network includes one first residual network and one first up-sampling layer.

The first feature reshaping network is configured to reshape a feature vector inputted to the first decoder into a feature map.

The Q first image reconstruction networks are configured to perform first feature restoration processing on the feature map to obtain a fused feature image.

The first convolution network is configured to perform convolution processing on the fused feature image and output a generated image corresponding to the feature vector inputted to the first decoder.

In an implementation, the second generator includes an encoder, a second decoder, and an identity recognition network.

The operation of invoking a second generator to process the second sample image $y_k$ to obtain a third predicted image $y''_k$ includes:
- invoking the encoder to encode the second sample image $y_k$ to obtain a second feature vector;
- invoking the identity recognition network to recognize the second sample image $y_k$ to obtain identification information of the second sample image $y_k$;
- invoking the second decoder to decode the second feature vector according to the identification information of the second sample image $y_k$ to obtain a third generated image and third region segmentation information, the third region segmentation information being used for indicating an avatar region in the third generated image; and
- extracting the third predicted image $y''_k$ from the third generated image according to the third region segmentation information.

In an implementation, the second decoder includes one second feature reshaping network, Q second image reconstruction networks, and one second convolution network, and Q is a positive integer. Each second image reconstruction network includes one second residual network, one second up-sampling layer, and one adaptive module.

The adaptive module is configured to acquire, in a decoding process of the second decoder, a third feature vector corresponding to the identification information based on the identification information of the second sample image $y_k$, and the third feature vector is used for indicating the second decoder to decode the feature vector inputted to the second decoder.

In an implementation, the apparatus further includes:
- a test video acquisition module, configured to acquire a test video after the model training module 1430 completes the training of the image processing model, the test video including R frame of test images, each frame of test image including a corrected avatar, and R being a positive integer;
- a fourth test image acquisition module, configured to invoke the first generator of the trained image processing model to respectively process the R frames of test images to obtain predicted images respectively corresponding to the R frames of test images, the R frames of predicted images include the target avatar of the target user, and the first type attribute of the avatars of the R frames of predicted images is kept consistent with the first type attribute of the corrected avatar in the corresponding test image;
- an image inpainting module, configured to perform image inpainting on the R frames of test images from which the corrected avatars are deleted in the test video; and
- a target video acquisition module, configured to respectively fuse the R frames of test images with the corresponding test images in the test video after the image inpainting to obtain a target video.

In an implementation, the first type attribute refers to a non-identity recognition attribute.

According to one embodiment of this disclosure, some of the steps involved in the image processing methods shown in FIG. 2 and FIG. 3 may be performed by various modules or sub-modules in the image processing apparatus shown in FIG. 14. Each module or sub-module in the image processing apparatus shown in FIG. 14 may be formed by separately or totally combining into one or several additional structures, or formed by splitting some module(s) therein into a plurality of functionally smaller structures, so as to realize the same operation without affecting the achievement of technical effects of the embodiments of this disclosure. The above modules are divided based on logical functions, and in practical applications, the functions of one module can also be realized by a plurality of modules, or the functions of the plurality of modules can be realized by one module. In other embodiments of this disclosure, the image processing apparatus may also include other modules, and in practical applications, these functions may also be realized with the assistance of other modules, and may be realized by cooperation of a plurality of modules.

According to another embodiment of this disclosure, an image processing apparatus as shown in FIG. 14 may be constructed and an image processing method according to the embodiment of this disclosure may be implemented by running a computer program (including program code) capable of executing the steps involved in the corresponding methods as shown in FIG. 2 or FIG. 3 on a general purpose computing apparatus such as a computer that includes a processing element and a storage element such as a central processing unit (CPU), a random access storage medium (RAM), and a read-only storage medium (ROM). The computer program may be recorded, for example, on a computer-readable recording medium, loaded in the above computing apparatus through the computer-readable recording medium, and run therein.

Based on the same inventive concept, problem solving principles and advantageous effects of the image processing apparatus according to the embodiment of this disclosure are similar to the problem solving principles and advantageous effects of the image processing method according to the embodiment of this disclosure, and reference can be made to the principles and advantageous effects of the implementation of the method, as described in the other embodiments herein.

Figure 15:
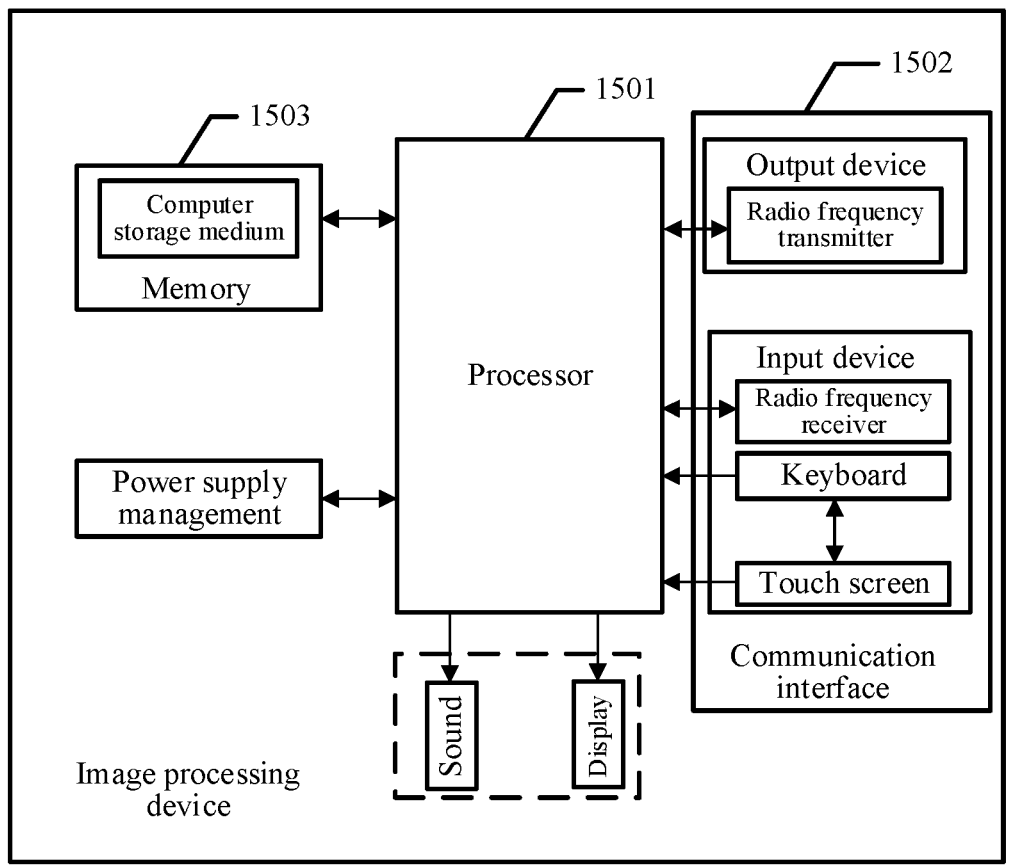
FIG. 15 is a schematic structural diagram of an image processing device according to an exemplary embodiment of this disclosure.

Reference is now made to FIG. 15, which is a schematic structural diagram of an image processing device according to an exemplary embodiment of this disclosure. The image processing device may be a server 102 as shown in FIG. 1. The image processing device at least includes a processor 1501, a communication interface 1502, and a memory 1503. The processor 1501, the communication interface 1502, and the memory 1503 may be connected by a bus or other means, and the embodiment of this disclosure is exemplified by a bus connection. The processor 1501 (or invoked a central processing unit (CPU)) is a calculation core and a control core of an image processing device, and can parse various instructions in the image processing device and process various data of the image processing device. For example: the CPU may be configured to parse an on-off instruction sent by a user to the image processing device, and control the image processing device to perform an on-off operation. For another example: the CPU may transmit various types of interactive data between internal structures of the image processing apparatuses, etc. The communication interface 1502 may in some implementations include a standard wired interface, a wireless interface (such as WI-FI and a mobile communication interface), and may be configured to transceive data under the control of the processor 1501. The communication interface 1502 may also be configured for transmission and interaction of data within the image processing device. The memory 1503 is a memory device in the image processing device, and is configured to store a program and data. It will be appreciated that the memory 1503 herein may include both a built-in memory of the image processing device and, of course, an extended memory supported by the image processing device. The memory 1503 provides storage space. The storage space stores an operating system of the image processing device, which may include, but is not limited to: an Android system, an iOS system, a Windows Phone system, and the like, which are not limited in this disclosure.

In an embodiment of this disclosure, the processor 1501 implements a solution shown in this disclosure by running executable program code in the memory 1503. The operations performed by the processor 1501 may be described with reference to the various method embodiments described above.

Based on the same inventive concept, problem solving principles and advantageous effects of the image processing device according to the embodiment of this disclosure are similar to the problem solving principles and advantageous effects of the image processing method according to the embodiment of this disclosure, and reference can be made to the principles and advantageous effects of the implementation of the method, as described in the other embodiments herein.

Embodiments of this disclosure further provide a computer-readable storage medium. The computer-readable storage medium stores a computer program. The computer program is adapted to be loaded by a processor and to perform the image processing method of the above method embodiments.

Embodiments of this disclosure further provide a computer program product or a computer program. The computer program product or the computer program includes computer instructions. The computer instructions are stored in a computer-readable storage medium. A processor of a computer device reads the computer instructions from the computer-readable storage medium, and the processor executes the computer instructions to enable the computer device to perform the above image processing method.

It is to be noted that for each of the foregoing method embodiments, for a brief description, they are described as a series of action combinations, but those skilled in the art are to be understood that this disclosure is not limited by the described action sequence, because certain steps may be performed in other sequences or concurrently in accordance with this disclosure. Secondly, those skilled in the art also to be understood that the embodiments described in the specification are all preferred embodiments, and the actions and the modules involved are not necessarily required in the embodiments of this disclosure.

The steps in the method of the embodiments of this disclosure can be sequentially adjusted, combined, and deleted according to actual needs.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals. The modules in the apparatus of the embodiments of this disclosure can be combined, divided, and deleted according to actual needs.

Those of ordinary skill in the art will appreciate that all or some of the steps in various methods of the above embodiments may be performed by a program to instruct associated hardware. The program may be stored in a computer-readable storage medium. The computer-readable storage medium may include: a flash drive, a ROM, a RAM, a magnetic disk, an optical disc, and the like.

What is disclosed above is merely exemplary embodiments of this disclosure, and certainly is not intended to limit the protection scope of this disclosure. A person of ordinary skill in the art may understand that all or some of processes that implement the above embodiments and equivalent modifications made in accordance with the claims of this disclosure shall fall within the scope of this disclosure.

What is claimed is:

1. An image processing method, comprising:

processing, with a first generator in an image processing model, a first sample image $x_i$ in a first sample set to obtain a first predicted image $x'_i$, the first predicted image $x'_i$ comprising a first predicted avatar, the first sample set comprising N first sample images, each of the first sample images comprising a target avatar corresponding to a same target user, N being a positive integer, i being a positive integer, and i≤N;

processing, with the first generator, a second sample image $y_k$ in a second sample set to obtain a second predicted image $y'_k$, the second predicted image $y'_k$ comprising a second predicted avatar; the second sample set comprising M second sample images, each of the second sample images comprising a sample avatar, M being a positive integer, k being a positive integer, and k≤M; and training the image processing model according to a difference between the target avatar in the first sample image $x_i$ and the first predicted avatar and a difference between a first type attribute of the sample avatar in the second sample image $y_k$ and a first type attribute of the second predicted avatar, the image processing model being configured to replace an avatar in an input image with the target avatar and retain the first type attribute of the avatar in the input image.

2. The method according to claim 1, wherein the first generator comprises an encoder and a first decoder, and the processing the first sample image $x_i$ in the first sample set to obtain the first predicted image $x'_i$ comprises:
   encoding, with the encoder, the first sample image $x_i$ to obtain a first feature vector; and
   decoding, with the first decoder, the first feature vector to obtain a first generated image and first region segmentation information, the first region segmentation information being for indicating an avatar region in the first generated image.

3. The method according to claim 2, the processing the first sample image $x_i$ in the first sample set to obtain the first predicted image $x'_i$ comprises:
   extracting the first predicted image $x'_i$ from the first generated image according to the first region segmentation information.

4. The method according to claim 1, wherein the first generator comprises an encoder and a first decoder, and the processing the second sample image $y_k$ in the second sample set to obtain the second predicted image $y'_k$ comprises:
   encoding, with the encoder, the second sample image $y_k$ to obtain a second feature vector; and
   decoding, with the first decoder, the second feature vector to obtain a second generated image and second region segmentation information, the second region segmentation information being for indicating an avatar region in the second generated image.

5. The method according to claim 4, wherein the processing the second sample image $y_k$ in the second sample set to obtain the second predicted image $y'_k$ comprises:
   extracting the second predicted image $y'_k$ from the second generated image according to the second region segmentation information.

6. The method according to claim 1, further comprising:
   acquiring a test video, the test video comprising R frames of test images, each frame of test image comprising a corrected avatar, and R being a positive integer;
   processing, with the first generator of the trained image processing model, the R frames of test images to obtain R frames of predicted images respectively corresponding to the R frames of test images, wherein the R frames of predicted images comprise the target avatar of the target user, and the first type attribute of the avatars of the R frames of predicted images is kept consistent with the first type attribute of the corrected avatar in the corresponding test image; and
   performing image inpainting on the R frames of test images from which the corrected avatars are deleted in the test video.

7. The method according to claim 6, further comprising:
   after the image inpainting, fusing the R frames of test images with the corresponding test images in the test video respectively to obtain a target video.

8. The method according to claim 1, wherein the first type attribute comprises a non-identity recognition attribute.

9. An image processing apparatus, comprising:
   a memory operable to store computer-readable instructions; and
   a processor circuitry operable to read the computer-readable instructions, the processor circuitry when executing the computer-readable instructions is configured to:
      process, with a first generator in an image processing model, a first sample image $x_i$ in a first sample set to obtain a first predicted image $x'_i$, the first predicted image $x'_i$ comprising a first predicted avatar, the first sample set comprising N first sample images, each of the first sample images comprising a target avatar corresponding to a same target user, N being a positive integer, i being a positive integer, and i≤N;
      process, with the first generator, a second sample image $y_k$ in a second sample set to obtain a second predicted image $y'_k$, the second predicted image $y'_k$ comprising a second predicted avatar; the second sample set comprising M second sample images, each of the second sample images comprising a sample avatar, M being a positive integer, k being a positive integer, and k≤M; and
      train the image processing model according to a difference between the target avatar in the first sample image $x_i$ and the first predicted avatar and a difference between a first type attribute of the sample avatar in the second sample image $y_k$ and a first type attribute of the second predicted avatar, the image processing model being configured to replace an avatar in an input image with the target avatar and retain the first type attribute of the avatar in the input image.

10. The apparatus according to claim 9, wherein the first generator comprises an encoder and a first decoder, and the processor circuitry is configured to:
    encode, with the encoder, the first sample image $x_i$ to obtain a first feature vector; and
    decode, with the first decoder, the first feature vector to obtain a first generated image and first region segmentation information, the first region segmentation information being for indicating an avatar region in the first generated image.

11. The apparatus according to claim 10, wherein the processor circuitry is configured to:
    extract the first predicted image $x'_i$ from the first generated image according to the first region segmentation information.

12. The apparatus according to claim 9, wherein the first generator comprises an encoder and a first decoder, and the processor circuitry is configured to:
    encode, with the encoder, the second sample image $y_k$ to obtain a second feature vector;
    decode, with the first decoder, the second feature vector to obtain a second generated image and second region segmentation information, the second region segmentation information being for indicating an avatar region in the second generated image.

13. The apparatus according to claim 12, wherein the processor circuitry is configured to:
    extract the second predicted image $y'_k$ from the second generated image according to the second region segmentation information.

14. The apparatus according to claim 9, the processor circuitry is further configured to:
    acquire a test video, the test video comprising R frames of test images, each frame of test image comprising a corrected avatar, and R being a positive integer;
    process, with the first generator of the trained image processing model, the R frames of test images to obtain R frames of predicted images respectively corresponding to the R frames of test images, wherein the R frames of predicted images comprise the target avatar of the target user, and the first type attribute of the avatars of the R frames of predicted images is kept consistent with the first type attribute of the corrected avatar in the corresponding test image; and perform image inpainting on the R frames of test images from which the corrected avatars are deleted in the test video.

15. The apparatus according to claim 14, the processor circuitry is further configured to:
after the image inpainting, fuse the R frames of test images with the corresponding test images in the test video respectively to obtain a target video.

16. A non-transitory machine-readable media, having instructions stored on the machine-readable media, the instructions configured to, when executed, cause a machine to:
process, with a first generator in an image processing model, a first sample image $x_i$ in a first sample set to obtain a first predicted image $x'_i$, the first predicted image $x'_i$ comprising a first predicted avatar, the first sample set comprising N first sample images, each of the first sample images comprising a target avatar corresponding to a same target user, N being a positive integer, i being a positive integer, and i≤N;
process, with the first generator, a second sample image $y_k$ in a second sample set to obtain a second predicted image $y_k'$, the second predicted image $y'_k$ comprising a second predicted avatar; the second sample set comprising M second sample images, each of the second sample images comprising a sample avatar, M being a positive integer, k being a positive integer, and k≤M; and
train the image processing model according to a difference between the target avatar in the first sample image $x_i$ and the first predicted avatar and a difference between a first type attribute of the sample avatar in the second sample image $y_k$ and a first type attribute of the second predicted avatar, the image processing model being configured to replace an avatar in an input image with the target avatar and retain the first type attribute of the avatar in the input image.

17. The non-transitory machine-readable media according to claim 16, wherein the first generator comprises an encoder and a first decoder, and the instructions are configured to cause the machine to:
encode, with the encoder, the first sample image $x_i$ to obtain a first feature vector;
decode, with the first decoder, the first feature vector to obtain a first generated image and first region segmentation information, the first region segmentation information being for indicating an avatar region in the first generated image; and
extract the first predicted image $x'_i$ from the first generated image according to the first region segmentation information.

18. The non-transitory machine-readable media according to claim 16, wherein the first generator comprises an encoder and a first decoder, and the instructions are configured to cause the machine to:
encode, with the encoder, the second sample image $y_k$ to obtain a second feature vector;
decode, with the first decoder, the second feature vector to obtain a second generated image and second region segmentation information, the second region segmentation information being for indicating an avatar region in the second generated image; and
extract the second predicted image $y'_k$ from the second generated image according to the second region segmentation information.

19. The non-transitory machine-readable media according to claim 16, the instructions are further configured to cause the machine to:
acquire a test video, the test video comprising R frames of test images, each frame of test image comprising a corrected avatar, and R being a positive integer;
process, with the first generator of the trained image processing model, the R frames of test images to obtain R frames of predicted images respectively corresponding to the R frames of test images, wherein the R frames of predicted images comprise the target avatar of the target user, and the first type attribute of the avatars of the R frames of predicted images is kept consistent with the first type attribute of the corrected avatar in the corresponding test image; and
perform image inpainting on the R frames of test images from which the corrected avatars are deleted in the test video.

20. The non-transitory machine-readable media according to claim 19, the instructions are further configured to cause the machine to:
after the image inpainting, fuse the R frames of test images with the corresponding test images in the test video respectively to obtain a target video.

* * * * *